(12) United States Patent
Bowlin

(10) Patent No.: US 6,752,052 B2
(45) Date of Patent: Jun. 22, 2004

(54) CUTTER ASSEMBLY

(75) Inventor: Geoffrey R. Bowlin, Oak Ridge, NC (US)

(73) Assignee: Delaware Capital Formation, Inc., Wilmington, DE (US)

(*) Notice: Subject to any disclaimer, the term of this patent is extended or adjusted under 35 U.S.C. 154(b) by 20 days.

(21) Appl. No.: 09/984,674

(22) Filed: Oct. 30, 2001

(65) Prior Publication Data

US 2003/0079582 A1 May 1, 2003

(51) Int. Cl.[7] .............................. B23B 1/00; B23B 3/06; B23B 5/14
(52) U.S. Cl. ................................ 82/1.11; 82/57; 82/92
(58) Field of Search ........................... 83/54, 497, 503, 83/507; 30/422, 425, 427, 434; 82/55, 57, 58, 92

(56) References Cited

U.S. PATENT DOCUMENTS

| | | | | |
|---|---|---|---|---|
| 703,213 A | * | 6/1902 | Parcells | 83/492 |
| 3,727,498 A | * | 4/1973 | Poran | 83/106 |
| 3,894,455 A | | 7/1975 | Stroobants | 82/58 |
| 4,181,050 A | | 1/1980 | Stroobants et al. | 82/56 |
| RE30,746 E | | 9/1981 | Stroobants et al. | 82/56 |
| 4,475,422 A | * | 10/1984 | Lawson | 83/13 |
| 4,538,489 A | * | 9/1985 | Takano | 82/71 |
| 4,557,167 A | | 12/1985 | Cvacho | 82/47 |
| 4,676,133 A | * | 6/1987 | Fujimura | 83/497 |
| 5,146,818 A | * | 9/1992 | Hellweg | 82/58 |
| 5,524,998 A | * | 6/1996 | Schwartz | 402/79 |
| 6,113,160 A | * | 9/2000 | Johansson et al. | 292/169 |

* cited by examiner

*Primary Examiner*—A. L. Wellington
*Assistant Examiner*—Brian D. Walsh
(74) *Attorney, Agent, or Firm*—Foley & Lardner LLP

(57) ABSTRACT

The present invention includes a cutter assembly and a method of using a cutter assembly. The cutter assembly comprises a fixed knife support shaft with a top end and a bottom end, a fixed knife mounted adjacent the top of the fixed knife support shaft, a moving knife support shaft with a top end and a bottom end and a moving knife mounted adjacent the top of the fixed knife support shaft, wherein the moving knife has a non-cutting position and a cutting position and the moving knife support is adapted to be rotated about an axis perpendicular to the axis of the moving knife support shaft to put the moving knife into the cutting position.

61 Claims, 18 Drawing Sheets

# CUTTER ASSEMBLY

FIELD OF THE INVENTION

The present invention is directed generally to machinery for can production and specifically to a cutter assembly for can fabrication.

BACKGROUND OF THE INVENTION

In the manufacture of metal cans, it is conventional practice to form an unfinished can or container of cylindrical configuration comprising of a bottom and a cylindrical side wall which is open on the top end. Such unfinished can members can be formed by a variety of processes such as drawing and ironing to provide the unfinished container. After the container has been formed, it is necessary to trim the upper end of the container to achieve a finished container having a desired height and also having a smooth upper edge termination permitting connection to a top member. It is essential that the upper edge termination be essentially flawless since the upper edge is subsequently subjected to an outward flanging process for enabling the connection of the top to the container. Any burrs, cracks or the like in the edge termination can prevent obtainment of a good seal between the top and the can in the flange area so as to render the can useless and to also result in the waste of its contents.

Numerous prior art devices have evolved for the purpose of trimming the ends of unfinished containers. However, all of the presently known conventional devices employed in trimming can ends suffer from one or more deficiencies and/or drawbacks. For example, the device of U.S. Pat. No. 3,894,455 incorporates two rotary cutting knives with circular cutting edges into a replaceable cartridge. The first knife is attached to a fixed knife support. The second knife is attached to a transversely shiftable knife support. By rotating the shiftable knife support about a pivot axis parallel to the axis of the fixed knife support, the shiftable knife is swung into the cutting position. The replaceable cartridge was an improvement over the prior art but the cartridge utilized small precision components to control the transverse motion. Thus, it was unsuited for long term operation.

The inventions of U.S. Pat. Nos. 4,181,050 and Re. 30,746 describe cutter assemblies which are more compact than U.S. Pat. No. 3,894,455. Additionally, they disclose a method of improving the quality of the trimmed edge by canting the trimmer unit 2.0 degrees from the axis of the can. The canting is accomplished by wedging shims between the cartridge and the turret plate. Although these assemblies are an improvement over U.S. Pat. No. 3,894,455, they require a skilled technician to calibrate the canting. Additionally, this patent also disclosed a more robust method for controlling transverse motion.

An additional problem with the inventions of U.S. Pat. Nos. 4,181,050 and Re. No. 30,746 concerns the adjustment of the clearance between the fixed knife and the shiftable knife necessary when assembling the unit. In order to adjust the prior art assemblies, the assembly is first partially disassembled by a skilled technician. The technician then adjusts the clearance by inserting shims in the assembly. The assembly is then reassembled and the clearance is measured. If the clearance is incorrect, the process is repeated. Typically, the process is repeated several times. This calibration is time-consuming and adds a significant cost to the overall process.

U.S. Pat. No. 4,557,167 discloses that maintaining one of the knives sharp and applying a radius to the cutting edge of the other knife, the burr can be transferred to the scrap ring. However, the invention of U.S. Pat. No. 4,557,167 uses disk knives whose longitudinal axes are generally perpendicular to one another. Thus, it is bulky and not suited for use in a cartridge.

The prior art cutter assemblies are either too large and bulky or are complicated and require a skilled technician to calibrate. Therefore, it would be desirable to have a cutter assembly which is both compact in size and simple to calibrate.

SUMMARY OF THE INVENTION

The present invention provides a cutter assembly comprising a fixed-longitudinal-axis knife support shaft with a top end and a bottom end, a fixed-longitudinal-axis knife mounted adjacent the top of the fixed-longitudinal-axis knife support shaft, a moving knife support shaft, having a top end, a bottom end and a longitudinal axis, the moving knife support shaft disposed to pivot substantially perpendicular to the longitudinal axis, and a moving knife mounted adjacent the top of the fixed-longitudinal-axis knife support shaft, wherein the moving knife has a non-cutting position and a cutting position and the moving knife support is adapted to be pivoted to put the moving knife into the cutting position. Further, the invention may comprise at least one flexible hinge and at least one spring. It also may include a rocker arm and a striker plate.

The present invention also includes a cutter assembly comprising a fixed-longitudinal-axis knife support shaft with a top end and a bottom end, a fixed-longitudinal-axis knife mounted adjacent the top end of the fixed-longitudinal-axis knife support shaft, a moving knife support block, a moving knife support shaft with a top end and a bottom end, the moving knife support shaft pivotably mounted in the moving knife support block, a moving knife mounted adjacent the top end of the fixed-longitudinal-axis knife support shaft and at least one flexible hinge affixed to the moving knife support block, wherein the moving knife has a non-cutting position and a cutting position and is adapted so that in the non-cutting position the moving knife support shaft is tilted away from the fixed-longitudinal-axis knife support shaft by flexing the flexible hinge such that the separation between the top of the fixed-longitudinal-axis knife support shaft and the top of the moving knife support increases while the separation between the bottom of the fixed-longitudinal-axis knife support shaft and the bottom of the moving knife support shaft remains essentially constant. The flexible hinge maybe made of any resilient material, for example fiberglass.

The present invention also includes a cutter assembly comprising a fixed-longitudinal-axis knife support shaft with a top end and a bottom end, a fixed-longitudinal-axis knife mounted adjacent the top end of the fixed-longitudinal-axis support shaft, a moving knife support block, a moving knife support shaft with a top end and a bottom end, the moving knife support shaft pivotably mounted in the moving knife support block, a moving knife mounted adjacent the top end of the moving knife support shaft and at least one flexible hinge affixed to the moving knife support block, wherein the moving knife has a non-cutting position and a cutting position and is adapted so that in to cutting position the moving knife support shaft is tilted toward the fixed-longitudinal-axis knife support shaft by flexing the flexible hinge such that the separation between the top of the fixed-longitudinal-axis knife support shaft and the top of the moving knife support decreases while the separation between the bottom of the fixed-longitudinal-axis knife support shaft and the bottom of the moving knife support shaft remains essentially constant.

The present invention also includes a method of trimming a container with an inside and an outside comprising conveying the container to a cutter assembly, advancing the container a predetermined distance onto a fixed-longitudinal-axis knife mounted on a fixed-longitudinal-axis knife support so that the fixed-longitudinal-axis knife is inside the container and a movable knife mounted on a movable knife support is outside of the container, the movable knife being opposed to the fixed-longitudinal-axis knife, pivoting the moving knife about an axis perpendicular to the longitudinal axis of the moving knife support shaft to put the moving knife into a cutting position from a non-cutting position, and cutting the container.

Additionally, the present invention includes a method of trimming a container with an inside and an outside comprising conveying the container to a cutter assembly, advancing the container a predetermined distance onto a fixed-longitudinal-axis knife mounted on a fixed-longitudinal-axis knife support so that the fixed-longitudinal-axis knife is inside the container and a movable knife mounted on a movable knife support is outside of the container, the movable knife being opposed to the fixed-longitudinal-axis knife, pivoting the moving knife from a non-cutting position to a cutting position by tilting the moving knife support shaft toward the fixed-longitudinal-axis knife support shaft by unflexing a flexible hinge such that the separation between the top of the fixed-longitudinal-axis knife support shaft and the top of the moving knife support decreases while the separation between the bottom of the fixed-longitudinal-axis knife support shaft and the bottom of the moving knife support shaft remains essentially constant, and cutting the container.

The invention also includes a method of trimming a container with an inside and an outside comprising conveying the container to a cutter assembly, advancing the container a predetermined distance onto a fixed-longitudinal-axis knife mounted on a fixed-longitudinal-axis knife support so that the fixed-longitudinal-axis knife is inside the container and a movable knife mounted on a movable knife support is outside of the container, the movable knife being opposed to the fixed-longitudinal-axis knife, pivoting the moving knife from a non-cutting position to a cutting position by tilting the moving knife support shaft toward the fixed-longitudinal-axis knife support shaft by flexing a flexible hinge such that the separation between the top of the fixed-longitudinal-axis knife support shaft and the top of the moving knife support decreases while the separation between the bottom of the fixed-longitudinal-axis knife support shaft and the bottom of the moving knife support shaft remains essentially constant, and cutting the container. Further, the clearance between the fixed-longitudinal-axis knife and the cutting knife may be set with an adjustment screw.

Additionally, the present invention provides a cutter assembly for trimming a container with an inside and an outside comprising a fixed-longitudinal-axis cutting means mounted on a fixed-longitudinal-axis support means, a movable cutting means mounted on a movable support means, a means for advancing the container a predetermined distance onto a fixed-longitudinal-axis knife mounted on a fixed-longitudinal-axis knife support so that the fixed-longitudinal-axis knife is inside the container and a movable knife mounted on a movable knife support is outside of the container, the movable knife being opposed to the fixed-longitudinal-axis knife, a means for pivoting the moving cutting means from a non-cutting position to a cutting position by tilting the moving support means toward the fixed-longitudinal-axis support means such that the separation between a first end of the fixed-longitudinal-axis support means and a first end of the moving support means decreases in the cutting position while the separation between a second end of the fixed-longitudinal-axis support means and a second end of the moving support means remains constant.

The present invention also provides a cutter assembly for trimming a container with an inside and an outside comprising a fixed-longitudinal-axis cutting means mounted on a fixed-longitudinal-axis support means, a movable cutting means mounted on a movable support means, a means for advancing the container a predetermined distance onto a fixed-longitudinal-axis knife mounted on a fixed-longitudinal-axis knife support so that the fixed-longitudinal-axis knife is inside the container and a movable knife mounted on a movable knife support is outside of the container, the movable knife being opposed to the fixed-longitudinal-axis knife and a means for pivoting the moving cutting means about an axis perpendicular to the axis of the moving support means to put the moving cutting means into the cutting position from a non-cutting position.

The present invention also includes an apparatus for trimming containers comprising, a rotating turret for supplying containers and any of the cutter assemblies described above.

BRIEF DESCRIPTION OF THE DRAWINGS

The foregoing and other features, aspects and advantages of the present invention will become apparent from the following description, appended claims and the exemplary embodiments shown in the drawings, which are briefly described below. It should be noted that unless otherwise specified like elements have the same reference numbers.

DETAILED DESCRIPTION OF THE PREFERRED EMBODIMENTS

Figure 1:
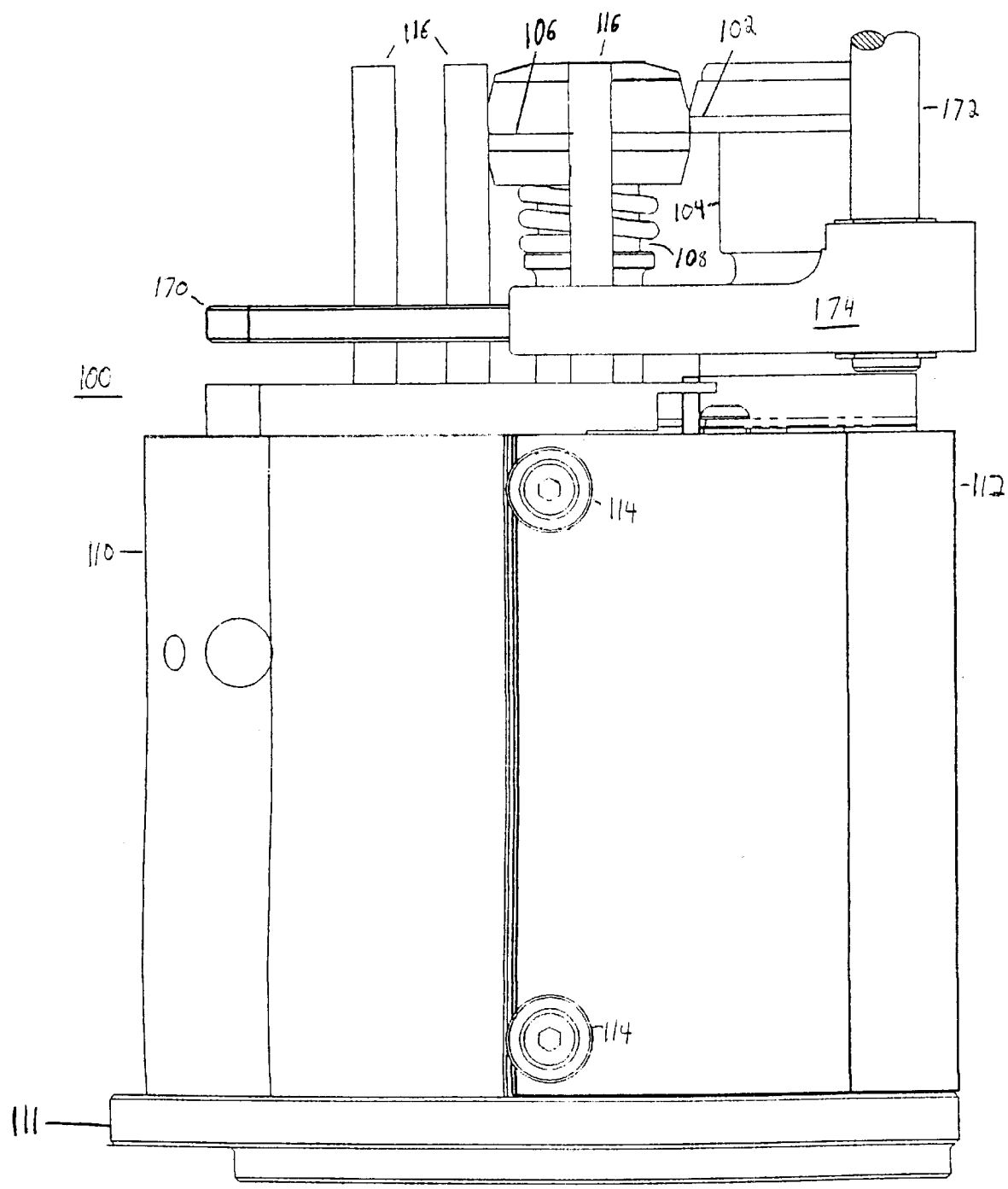
FIG. 1 is a side view of the first embodiment of the invention.

FIG. 1 illustrates a cutter assembly 100 according to the first embodiment of the invention. The cutter assembly 100 has a moving knife 102 affixed to the top of a moving knife support shaft 104 and a fixed-longitudinal-axis knife 106 attached to a fixed-longitudinal-axis knife support shaft 108. Encasing the knives 102, 106 and the knife support shafts 104, 108 is a two piece housing 110, 112. The first housing piece 110 is secured to the second housing piece 112 by bolts 114. Also included in the cutter assembly 100 are positioning rods 116 for accurately positioning cans on the cutter assembly 100. Optionally, an adjustment screw (discussed in more detail below) for adjusting the moving knife 102 can be threaded through a hole in the rear flange 111.

The fixed-longitudinal-axis knife 106 is fixed in space. That is, it does not translate off its axis once it is mounted in the assembly 100. However, in the preferred embodiment of the invention, the fixed-longitudinal-axis knife support shaft 108, and hence the fixed-longitudinal-axis knife 106, is configured to spin about its axis. The moving knife support shaft 104 and the moving knife 102, unlike the fixed-longitudinal-axis knife support shaft 108 and the fixed-longitudinal-axis knife 106, are designed to tilt. That is, the moving knife support shaft 104 and the moving knife 102 can pivot about a pivot point 145, In the preferred embodiment, the pivot point 145 (shown in FIG. 5) is allowed to move slightly vertically as the support shaft 104 is moved. Further, in the preferred embodiment, the moving knife support shaft 104 and the moving knife 102 spin about the axis of the moving knife support shaft 104.

The preferred embodiment of the invention also includes a scrap stripper actuating assembly 170/172/174. The assembly comprises a stripper plate 170, two actuating rods 172 and a yoke 174. The scrap stripper assembly removes the scrap ring which remains alter a can has been completely trimmed and withdrawn. To remove the scrap ring, the actuating rods 172 are drawn forward (away from the cutter assembly 100), pulling on one end of the yoke 174. The other end of the yoke 174, attached to the stripper plate 170, pulls the stripper plate 170 forward, moving the scrap ring past the fixed-longitudinal-axis knife 106.

Figure 2:
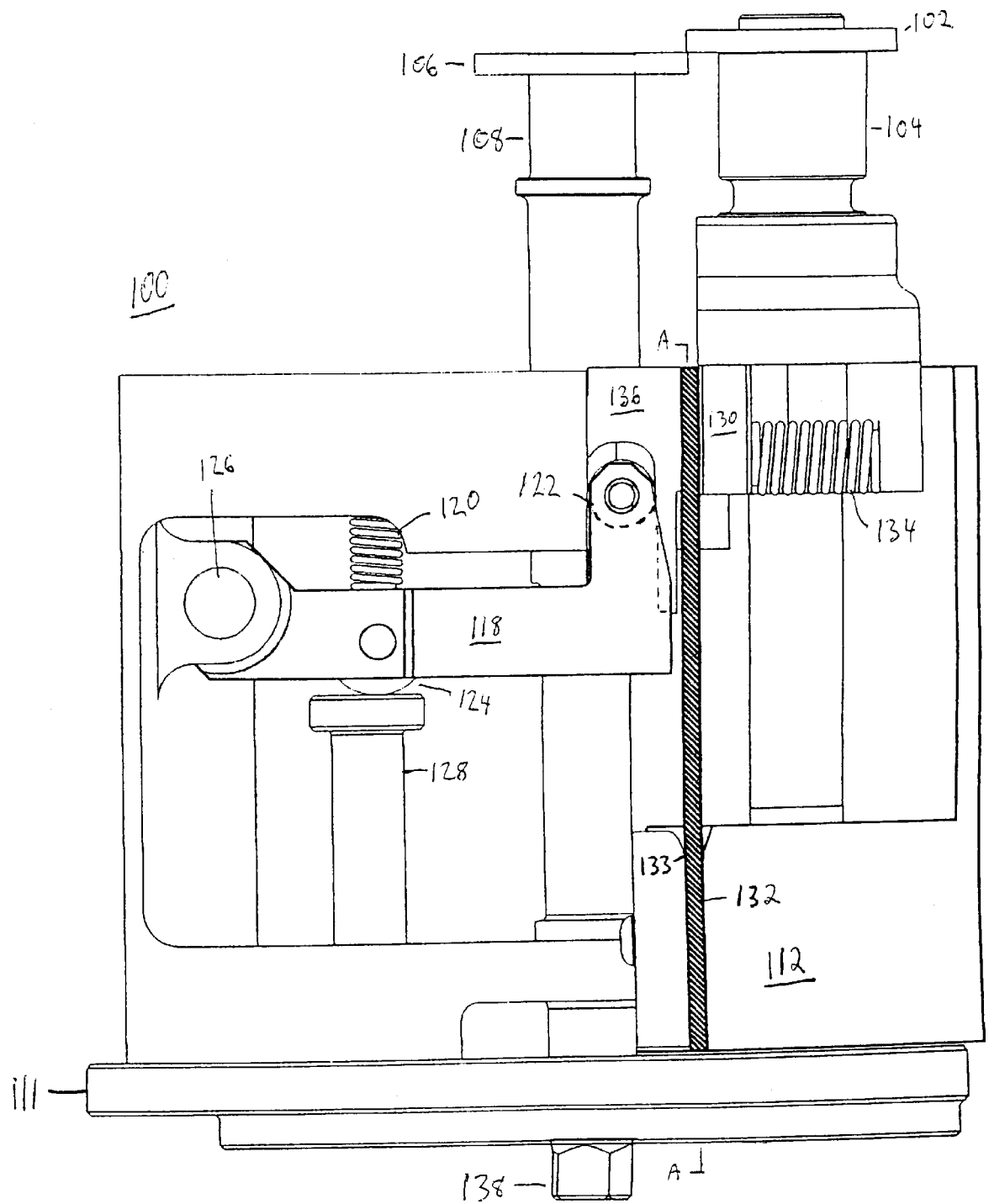
FIG. 2 is a partial cut-away of the first embodiment of the invention in the cutting position.

FIG. 2 illustrates a partial cut-away of the first embodiment of the invention in a cutting position. In this position, the moving knife support shaft 104 is essentially parallel to the fixed-longitudinal-axis knife support shaft 108, The moving knife 102 is held in the cutting position by a moving knife spring 134 which presses against the moving knife support block 130. Also attached to the moving knife support block 130 is a flexible hinge 132 to be described below. The flexible hinge 132 maybe made from a variety of materials, to be discussed below, that provide a predetermined spring characteristic. The upper end of the flexible hinge 132 is bolted to the lower end of the moving knife support block 130 while the lower end of the flexible hinge 132 is bolted to the second housing piece 112. Attached to the upper end of the flexible hinge 132, opposite the moving knife support block 130, is a striker plate 136. Abutting the striker plate 136 is a first rocker wheel 122 of a rocker arm 118. The rocker arm 118 is adapted to rotate about a rocker hinge or axis 126. In the cutting position, a push rod 128 pushes against a second rocker wheel 124 affixed to rocker arm 118. Exerting a force opposite the push rod 128 is a rocker spring 120. Additionally, in the cutting position, the moving knife 102 overlaps the fixed-longitudinal-axis knife 106. The overlap is preset in the factory and is preferably between 0.000 and 0.020 inches. More preferably, the overlap is between 0.005 and 0.0 15 inches. Further, the position of the moving knife 102 can be transposed with the fixed-longitudinal-axis knife 106 so that an inside rather than outside burr is formed.

Figure 3:
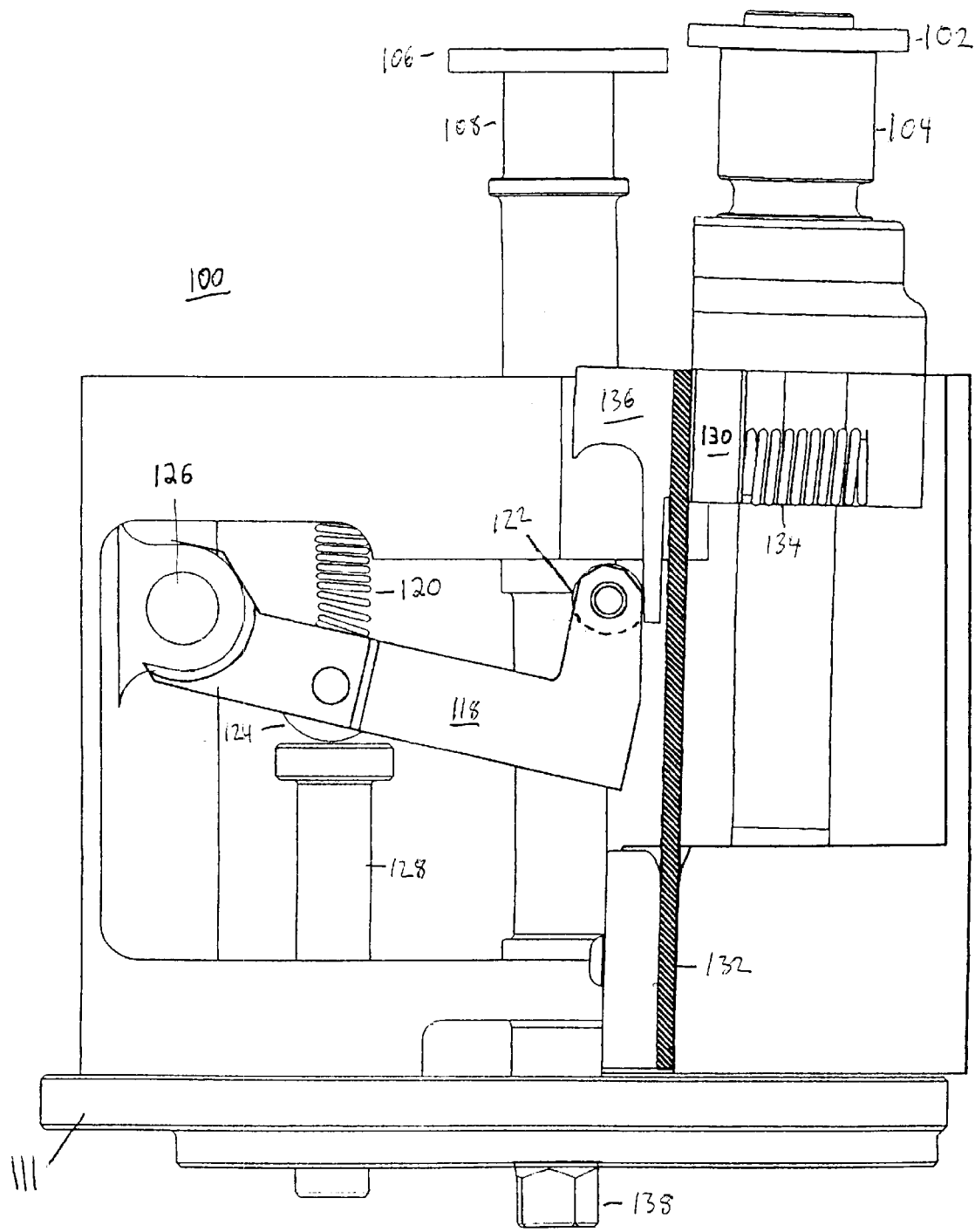
FIG. 3 is a partial cut-away of the first embodiment of the invention in the non-cutting position.

FIG. 3 illustrates a partial cut-away of the first embodiment of the invention in a non-cutting position. When the push rod 128 is allowed to withdraw, rocker spring 120 exerts a force causing the rocker arm 118 to pivot about the rocker hinge 126. As the rocker arm 118 rotates, the first rocker wheel 122 is caused to travel downward and to push against the striker plate 136 as it travels, causing the flexible hinge 132 to flex and the knife spring 134 to compress. The moving knife support block 130, the moving knife support shaft 104 and the moving knife 102 then tilt away from the fixed-longitudinal-axis knife 106. The degree of tilt is preferably between ½ and 3 degrees and more preferably between 1 and 2 degrees. The corresponding gap between the moving knife 102 and the fixed-longitudinal-axis knife 106 is preferably between 0.060 inches and 0.280 inches and more preferably between 0.120 inches and 0.160 inches.

The use of the flexible hinge 132 has many advantage over prior art methods which transversely shifted the moving knife 102. Because the flexible hinge 132 is made of a resilient material, there are no moving pieces as found in conventional hinges. Thus, there are no moving pieces to wear out. Further, there is no need for lubrication. Additionally, the tilting mechanism is more compact and simpler than the translating mechanisms of the prior art.

Figure 4:
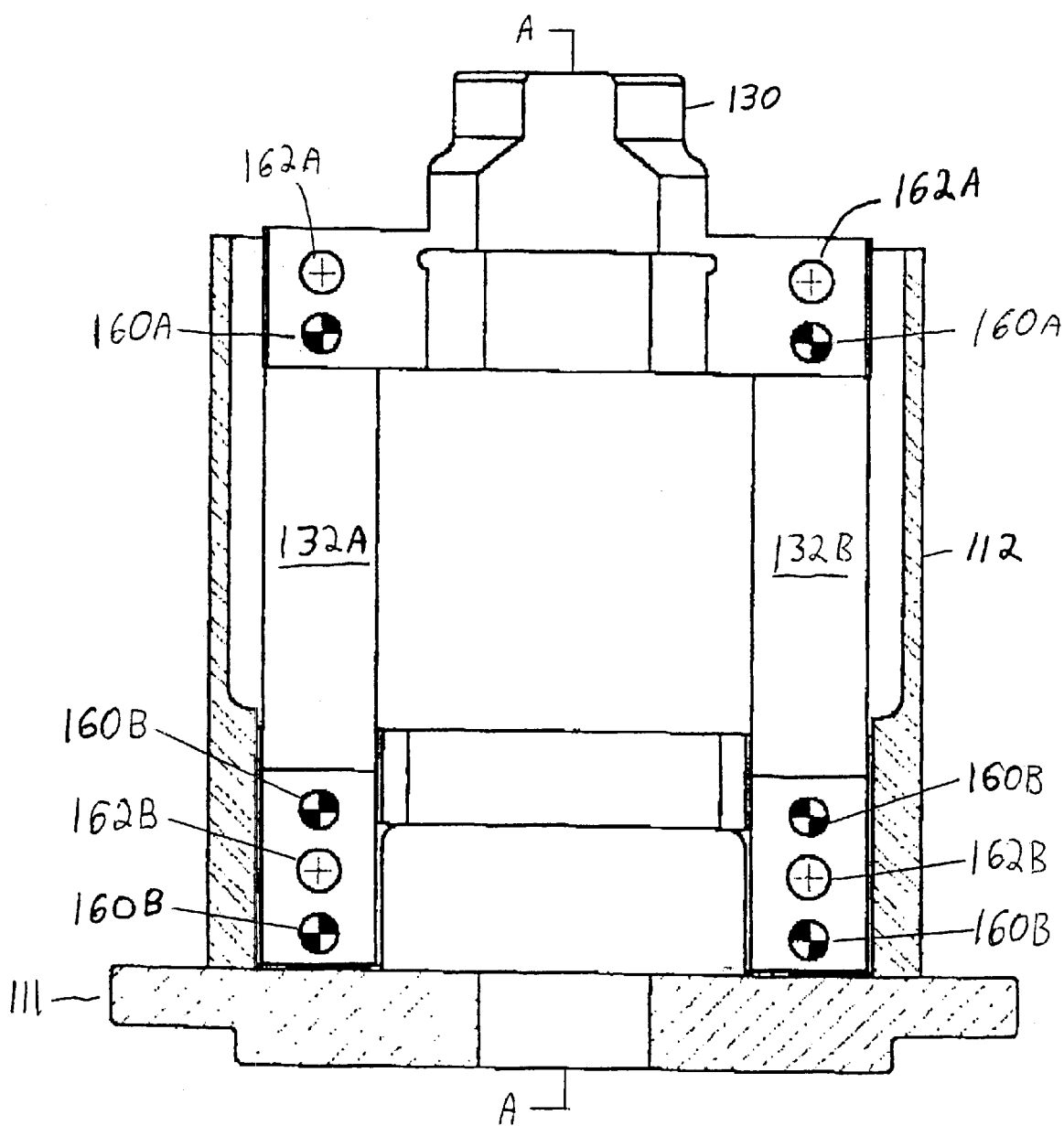
FIG. 4 is a sectional view of the first embodiment of the invention through line AA in FIG. 2.

In the preferred embodiment of the invention, the flexible hinge comprises two pieces, 132A and 132B as shown in FIG. 4. The two piece design minimizes the amount of hinge material while still providing sufficient control over the moving knife 102. Typically, the moving knife 102 of the present invention can be moved with a tolerance of about 0.0002 inches. Of course, the flexible hinge 132 could be made out of a single piece of material. Further, in order to avoid interference with other parts, the single piece may be in the shape of an "X", an "H" or include cutouts of various configurations. The preceding examples are for illustration only and are not intended to limit the scope of the invention. Also illustrated in FIG. 4 are dowel holes 160A, 160B and bolt holes 162A, 162B in the flexible hinge pieces 132A and 132B. When manufacturing the cutter assembly 100, the housing 112, flexible hinge 132 and moving knife support block 130 are first assembled together. The hinge pieces 132A and 132B are placed in a fixture and held in position by dowel rods placed through the dowel holes 160B. This gives the technician the ability to precisely align the parts. After aligning the parts, they are bolted together by bolts inserted through holes 162A. They are then installed as a unit into the housing 112, located by the dowel holes 160B and secured with bolts through holes 162B.

The flexible hinge 132 may be made out of any resilient material which has a suitable spring constant. Because the overall spring characteristics of the flexible hinge 132 are a function of both material and design, a wide range of materials may be used. Preferably, the flexible hinge 132 is made of fiberglass. However, with suitable design, the flexible hinge 132 may be made of polymer or plastic materials, various metals, alloys or composites.

Figure 5:
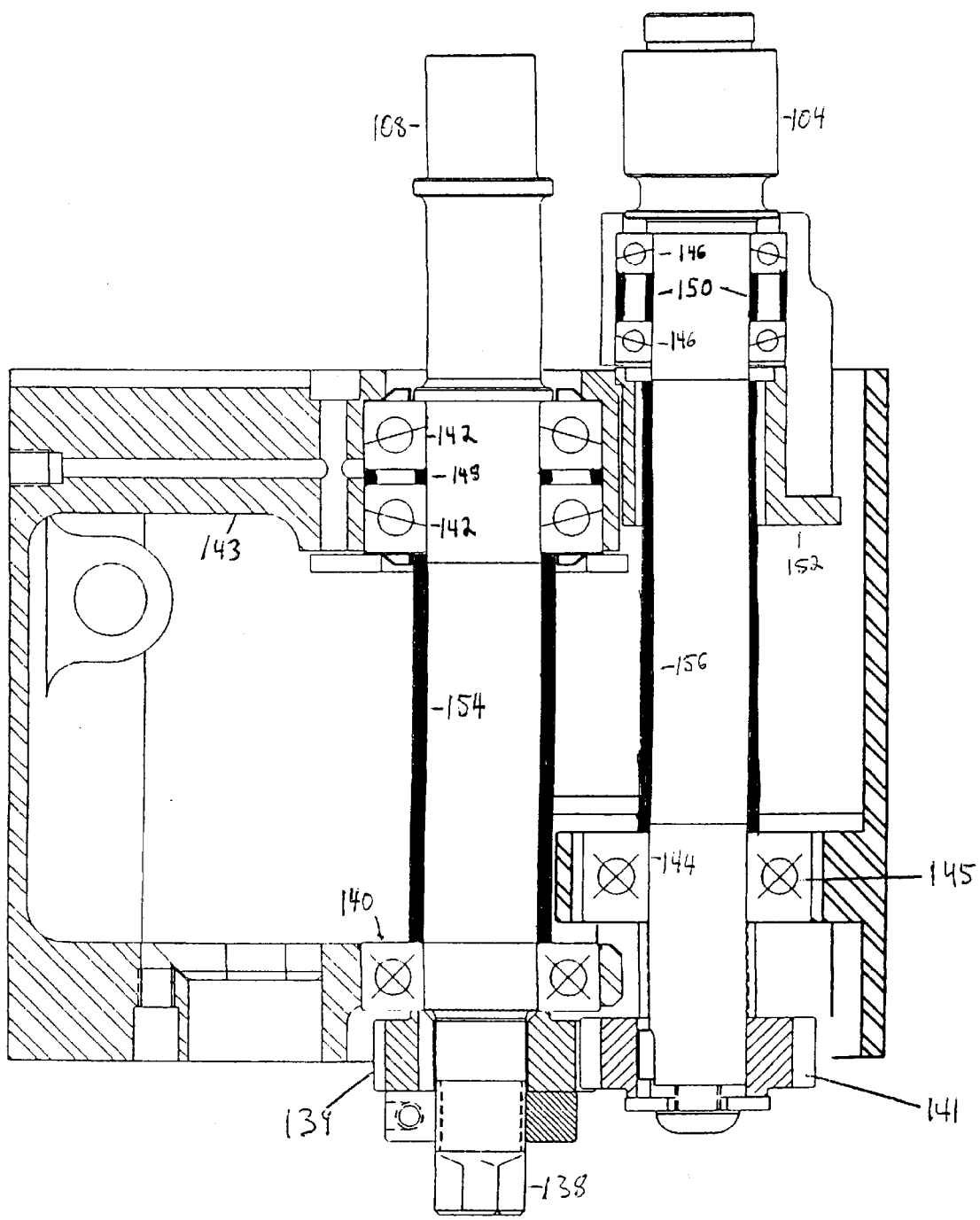
FIG. 5 is a sectional view of the first embodiment of the invention through line AA in FIG. 4.

FIG. 5 is a sectional view of the first embodiment of the invention through AA of FIG. 4. As seen in the figure, the fixed-longitudinal-axis knife support shaft 108 is supported by a lower bearing 140 and two upper fixed-longitudinal-axis shaft bearings 142. Preferably, the bearings 140, 142 are conventional precision ball bearings. However, the bearings 140, 142 may be angular contact ball bearings, taper roller bearings or bearing combinations such as a thrust-race and roller bearing. Separating the upper fixed-longitudinal-axis shaft bearings 142 are upper spacers 148. The upper fixed-longitudinal-axis shaft bearings 142 are supported by and separated from the lower bearing 140 by a lower spacer 154. Additionally, the upper fixed-longitudinal-axis shaft bearings 142 are clamped by a bearing clamp 143. Further, the bottom portion 138 of the fixed-longitudinal-axis knife support shaft 108 is adapted to be connected to a transmission in a trimmer. Thus, power to spin the fixed-longitudinal-axis knife support shaft 108 is transmitted through bottom portion 138. Additionally, a fixed-longitudinal-axis shaft gear 139 is included proximal to the bottom of the fixed-longitudinal-axis support shaft 108.

The moving knife support shaft 104 is supported at the lower end by lower bearing 144 and at the upper end by upper bearings 146. Preferably the lower bearing 144 is a conventional spherical roller bearing. However a spherical ball bearing or a radial bearing with a spherical seat or a spherically arranged bushing or some combination of these could be used. This arrangement permits the moving shaft 104 to pivot in the lower bearing 144 while being repeatably positioned through the action of the flexible hinge 132 and the upper bearings 146. Preferably the upper bearings 146 are conventional preloaded precision ball bearings. However, the upper bearings 146 may be an angular contact ball bearing, taper roller bearing or a bearing combination such as a thrust-race and roller bearing. Separating the moving shaft upper bearings are upper spacers 150. The upper bearings 146 are supported by and separated from the lower bearing 144 by a lower spacer 156. Additionally, the upper bearings 146 are clamped by a bearing support 152. Moving shaft gear 141 is included proximal to the lower end of the moving knife support shaft 104 and meshes with fixed-longitudinal-axis shaft gear 139 gear included proximal to the lower end of the fixed-longitudinal-axis knife support shaft 108. Thus, both support shafts 104, 108 rotate in tandem while only needing one connection (through lower portion 138) to the trimmer.

Figure 6:
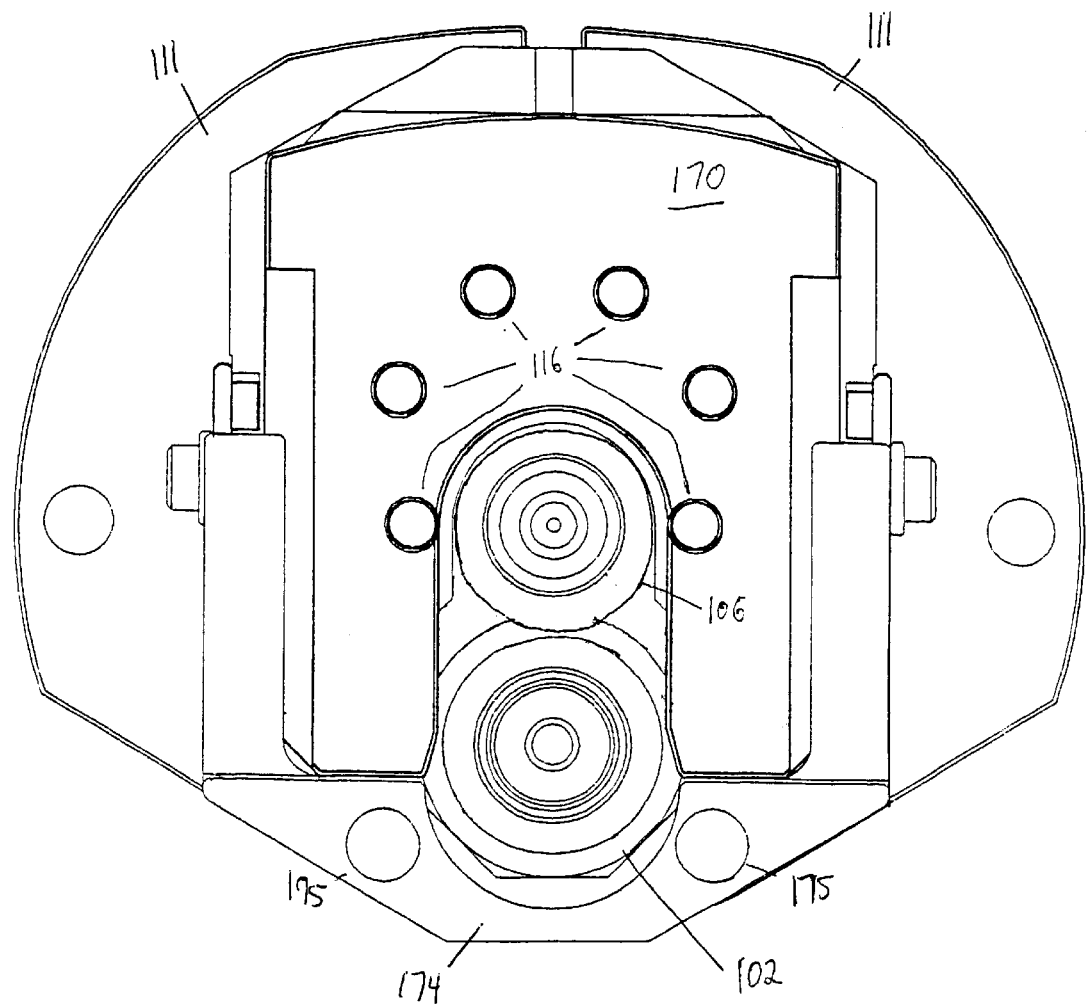
FIG. 6 is a plan view of the top of the first embodiment of the invention.
Figure 7:
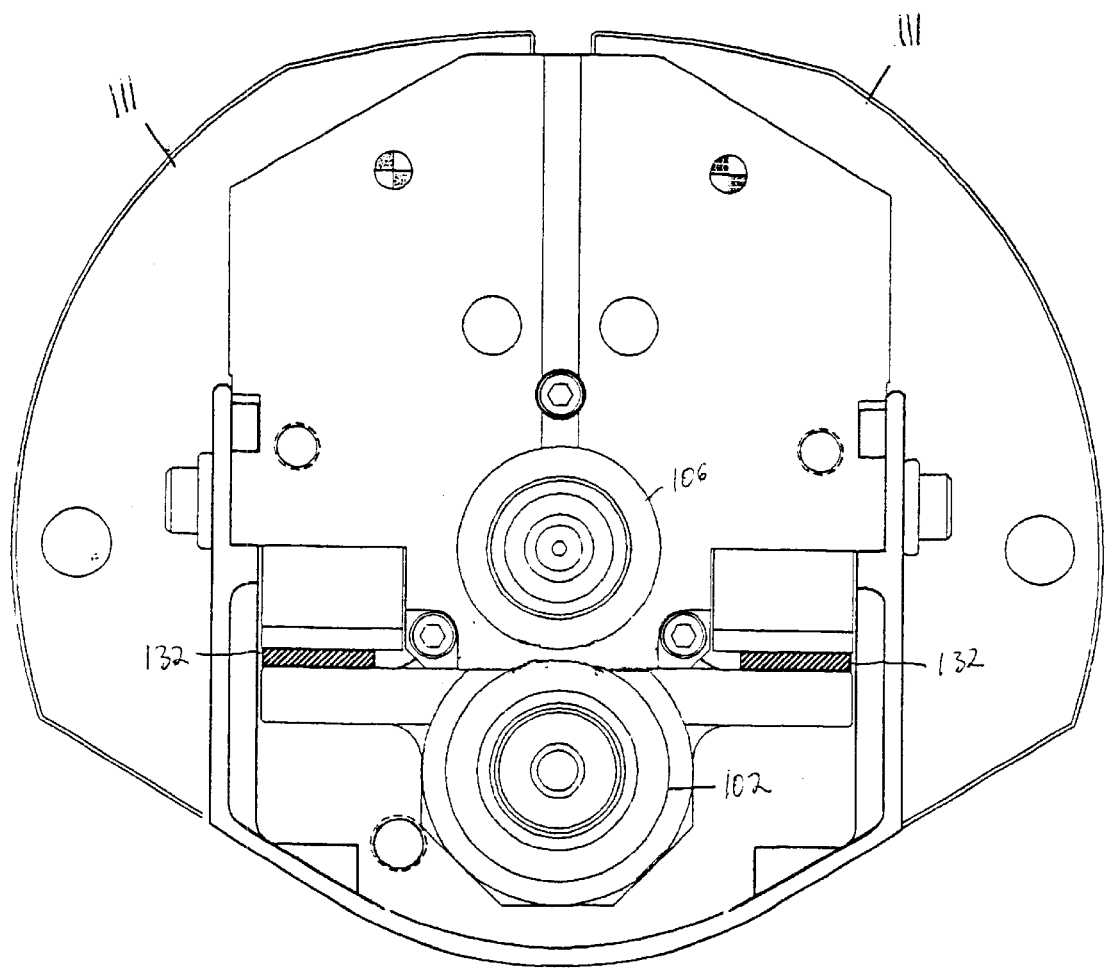
FIG. 7 is a plan view of the top of the first embodiment of the invention with the scrap stripper actuating assembly removed.

FIG. 6 is a plan view of the top of the cuter assembly 100 according to the first embodiment of the invention. This figure illustrates the relative positions of the moving knife 102, the fixed-longitudinal-axis knife 106 and the positioning rods 116. Also shown in FIG. 6 are the stripper plate 170 and two actuating rod holes 175. The actuating rod holes 175 are adapted to receive the actuating rods 172 that move the stripper plate 170 into a non-stripping position. FIG. 7 is a plan view of the top of the cutter assembly 100 according to the first embodiment of the invention with the stripper actuating assembly removed. It illustrates the relative positions of the moving knife 102, the fixed-longitudinal-axis knife 106 and the flexible hinge 132.

Figure 8:
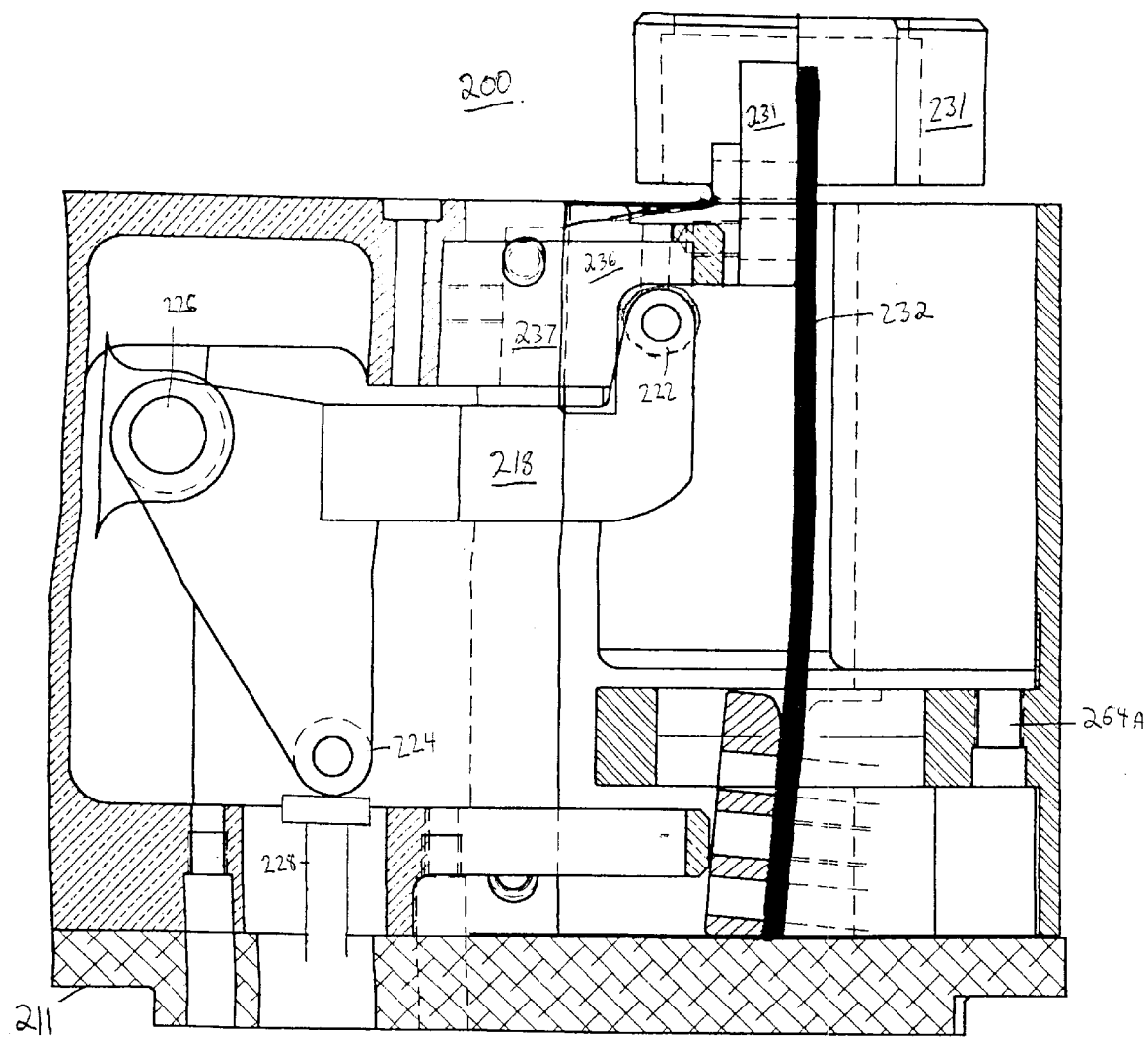
FIG. 8 is a partial cut-away side view of a second embodiment of the invention.

FIG. 8 illustrates a second embodiment of the invention. In this embodiment of the invention, the flexible hinge 232 of cutter assembly 200 is initially flexed when the moving knife (not shown) is in the cutting position. The upper portion of the flexible hinge 232 is attached to a flange 231 on a moving knife support block 230. Also attached to the flange 231 is a striker plate 236. Abutting the striker plate 236 is a first rocker wheel 222 of rocker arm 218. In the cutting position, the depth of cut is set by a stop plate 237, i.e., the moving knife is pulled forward until the striker plate 236 abuts the stop plate 237.

The rocker arm 218 is adapted to rotate about a rocker hinge 226. In the cutting position, a push rod 228 pushes against a second rocker wheel 224 affixed to rocker arm 218. When the push rod 228 is withdrawn, the rocker arm 218 rotates about the rocker hinge 226. As the rocker arm 218 rotates, the first rocker wheel 222 rides along the striker plate 236, allowing the flexible hinge 232 to straighten. As illustrated in FIG. 8, the top portion of the flexible hinge 232 moves to the right. In this embodiment, there are no additional springs to aid in moving the moving knife support block 230. Thus, the flexible hinge 232 must have sufficient resilience to move the moving knife support block 230 into a non-cutting position without the aid of a spring.

Figure 9:
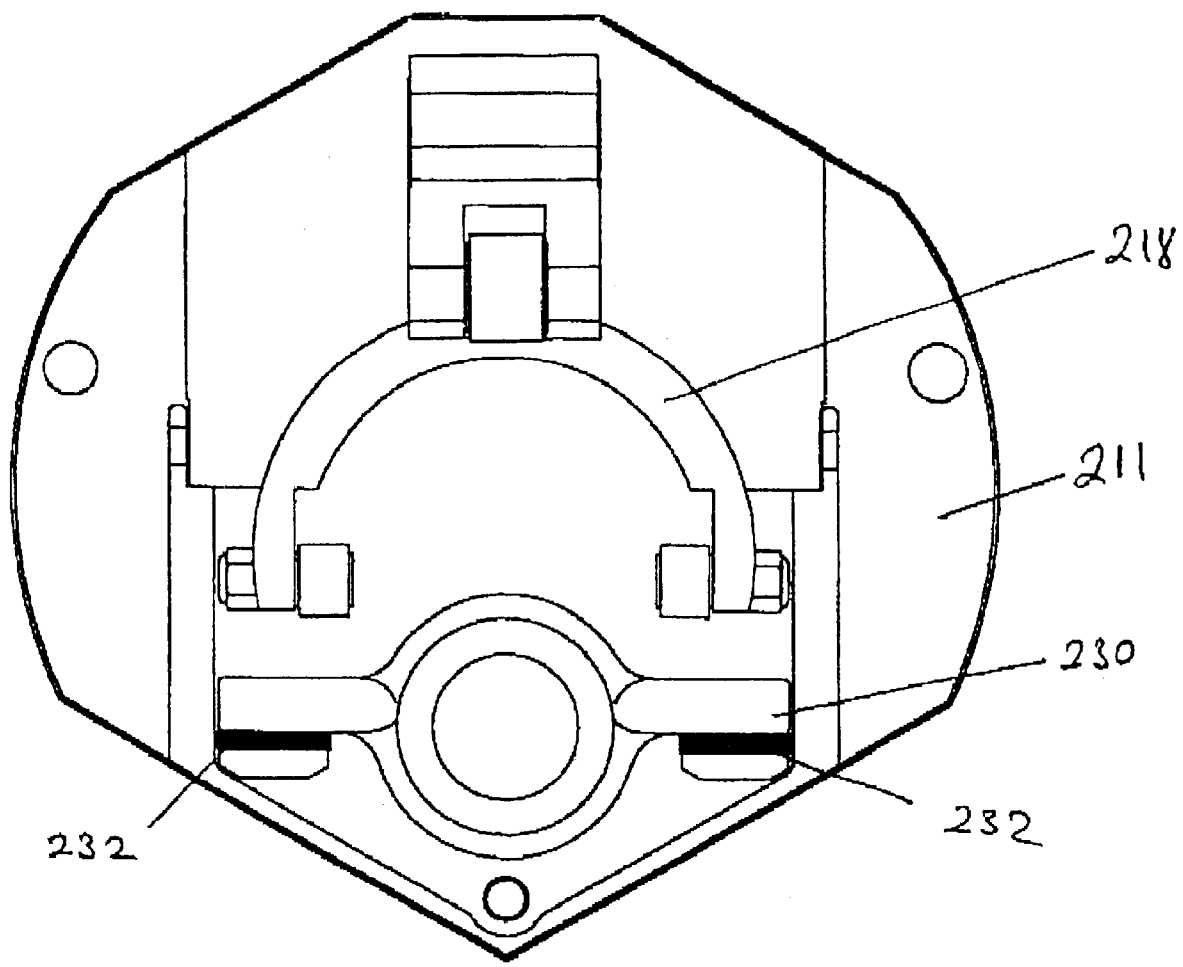
FIG. 9 is a top cut-away view of the second embodiment of the invention.
Figure 10:
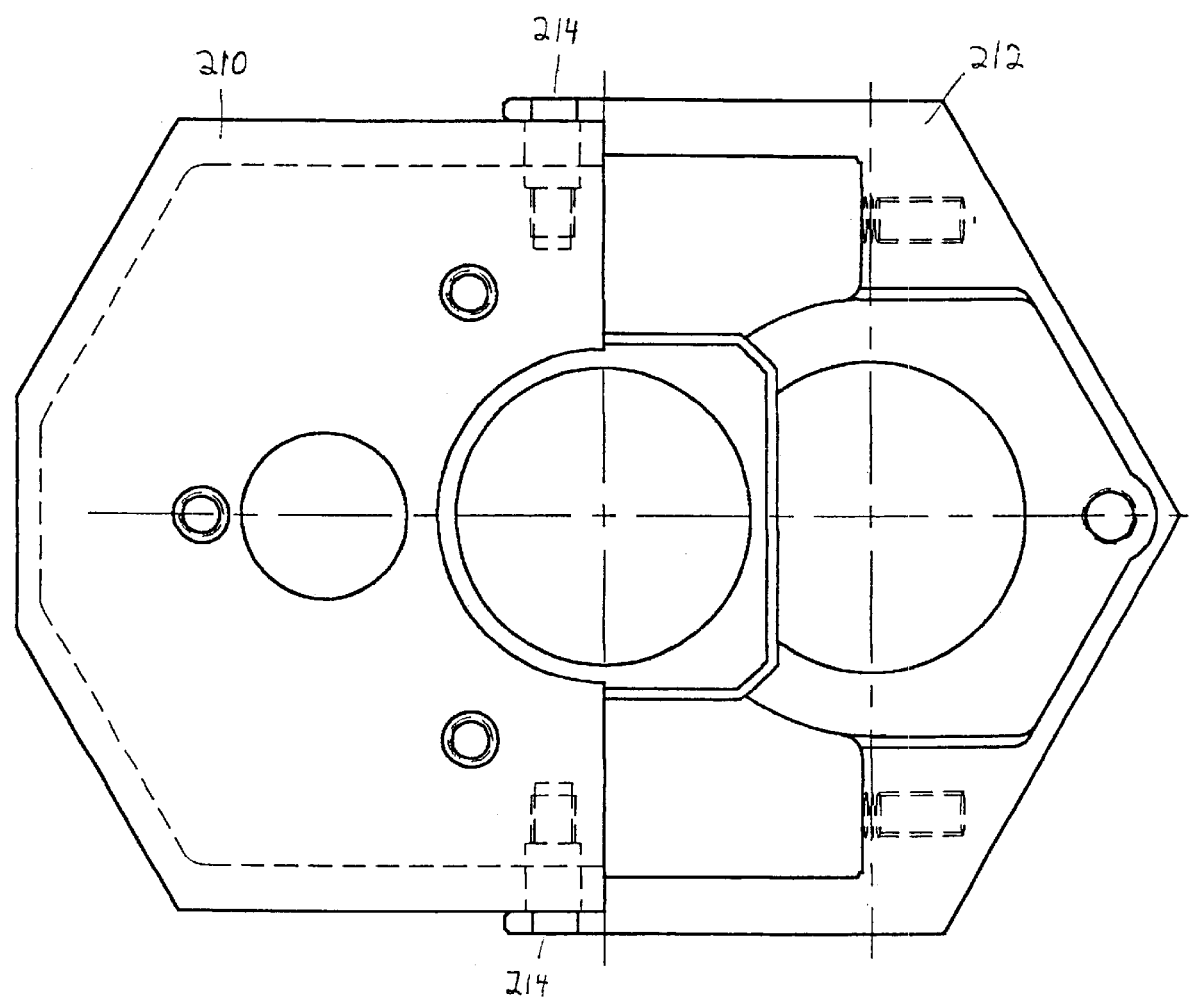
FIG. 10 is a bottom cut-away view of the second embodiment of the invention.

FIG. 9 is a top cut-away view of the second embodiment of the invention. This figure illustrates the relative positions of the rocker arm 218, the moving knife support block 230 and the flexible hinge 232. FIG. 10 is a bottom cut-away view of the second embodiment of the invention. It illustrates the two piece housing 210, 212 common to the preferred embodiments of the invention.

Figure 11:
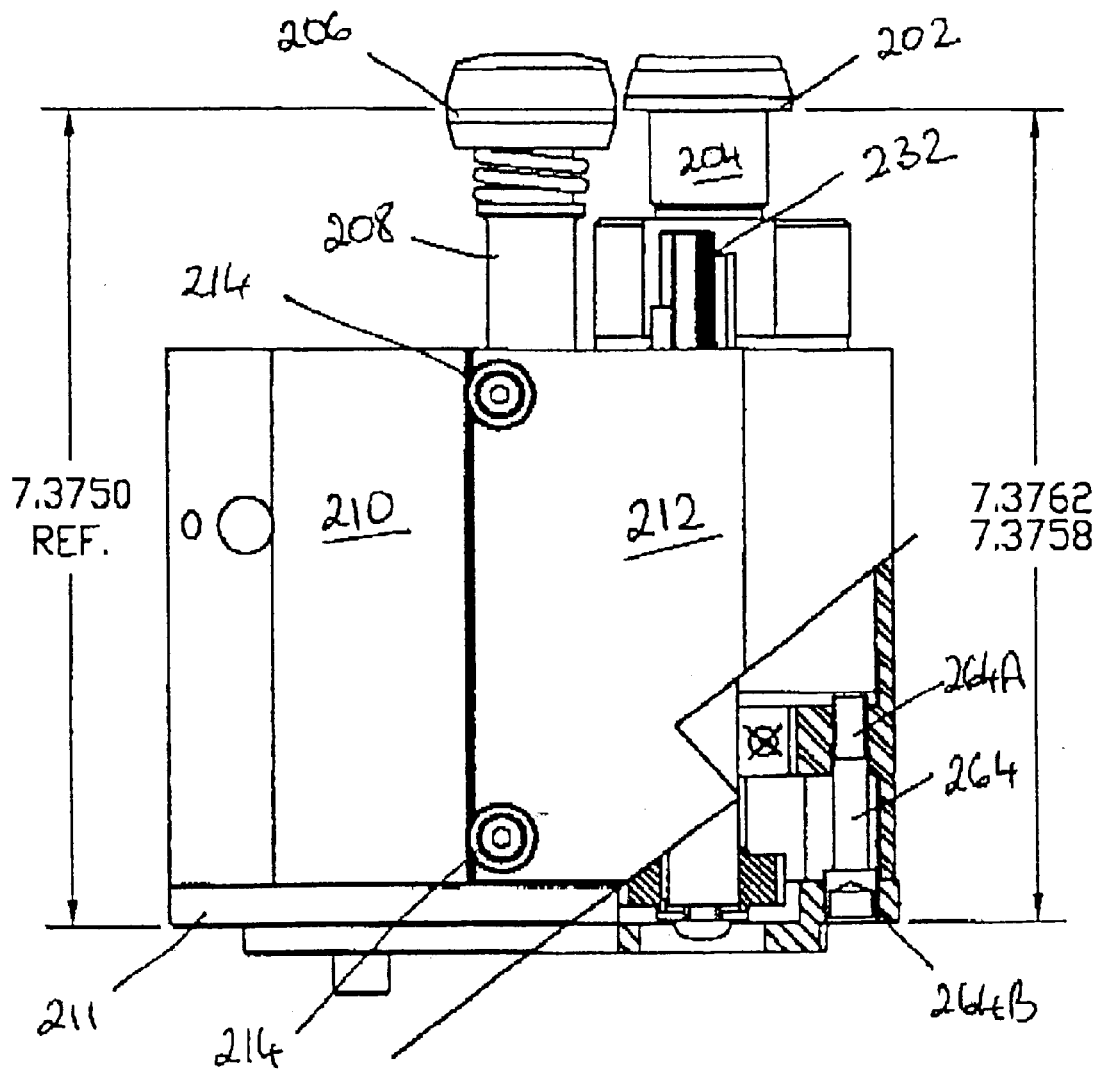
FIG. 11 is a partial sectional view of an additional aspect of the invention.
Figure 11A:
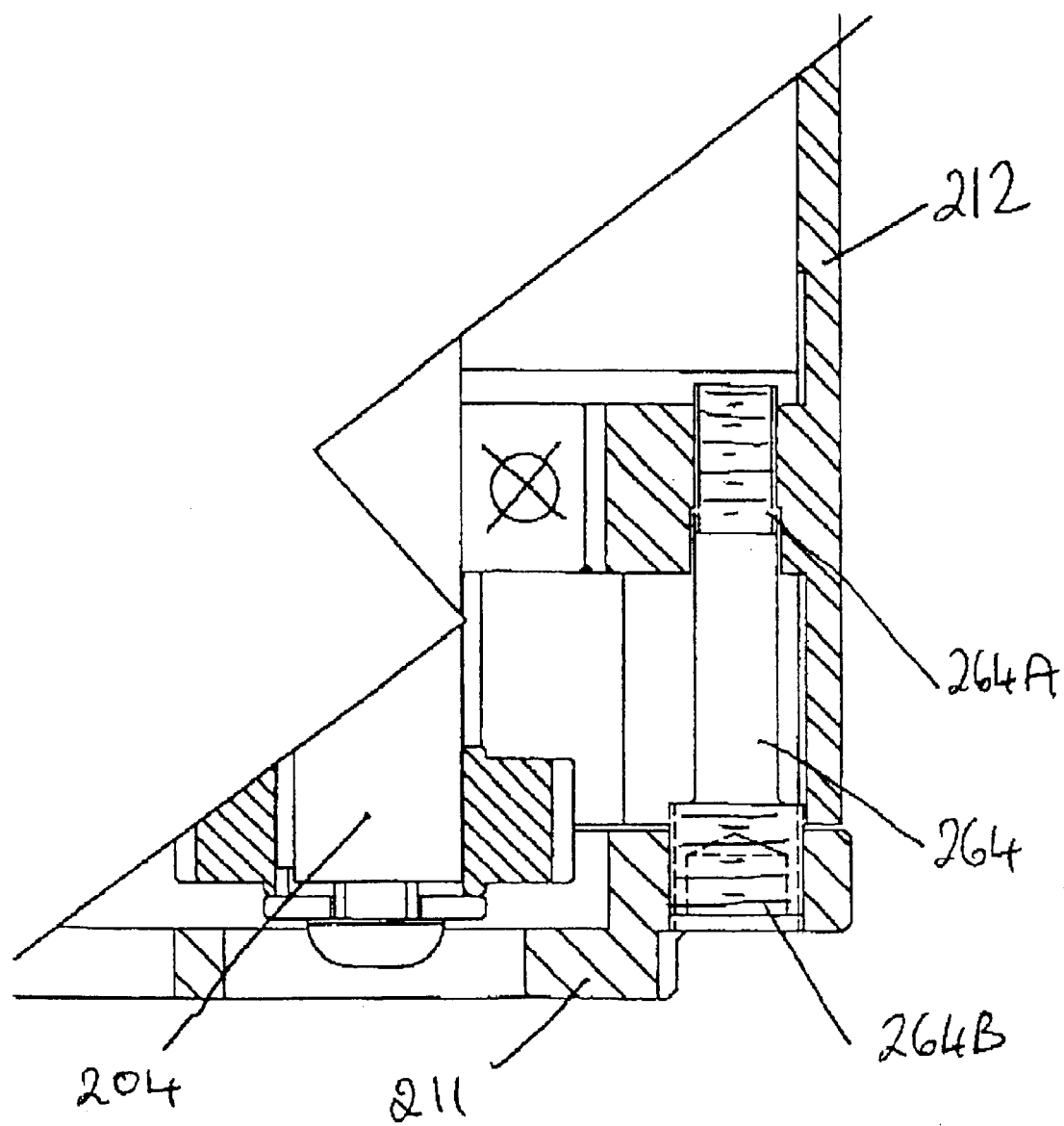

FIG. 11 is a partial section of an additional aspect of the preferred embodiment of the invention. FIG. 11a is an enlarged detail view of FIG. 11. These figures illustrate the adjustment mechanism for adjusting the clearance between the moving knife 202 and the fixed-longitudinal-axis knife 206. Instead of using the shims of the prior art, an adjustment screw 264 is provided. This adjustment screw 264 is a compound screw, that is threaded with a different pitch at either end. Turning a screw of this type moves components engaged with the two threaded sections relative to one another by the difference in the thread pitch. The adjustment screw 264 is threaded into hole 264B in the rear flange 211 and then into the hole 264A on the bottom of housing 212. By turning the adjustment screw 264 the position of housing 212 together with all parts attached to it, in particular the moving knife 202, can be adjusted precisely relative to the rear flange 211 and thus to the housing 210 and the parts attached to it, in particular the fixed-longitudinal-axis knife 206. After the adjustment screw is utilised to precisely position the knives relative to one another within a range of 0.0004 inches, the screws 214 are used to clamp the housings securely together. In the preferred embodiment, the thread pitches are 16 and 20 threads per inch so one full turn of the screw generates 0.0125 inches of movement between the knives, considered another way, one degree of rotation of the adjustment screw changes the knife clearance by slightly less than 4 millionths of an inch. Thus, unlike the prior art cutter assemblies, the clearance in the preferred embodiment of the invention can be easily adjusted after manufacturing the assembly 200.

Figure 12:
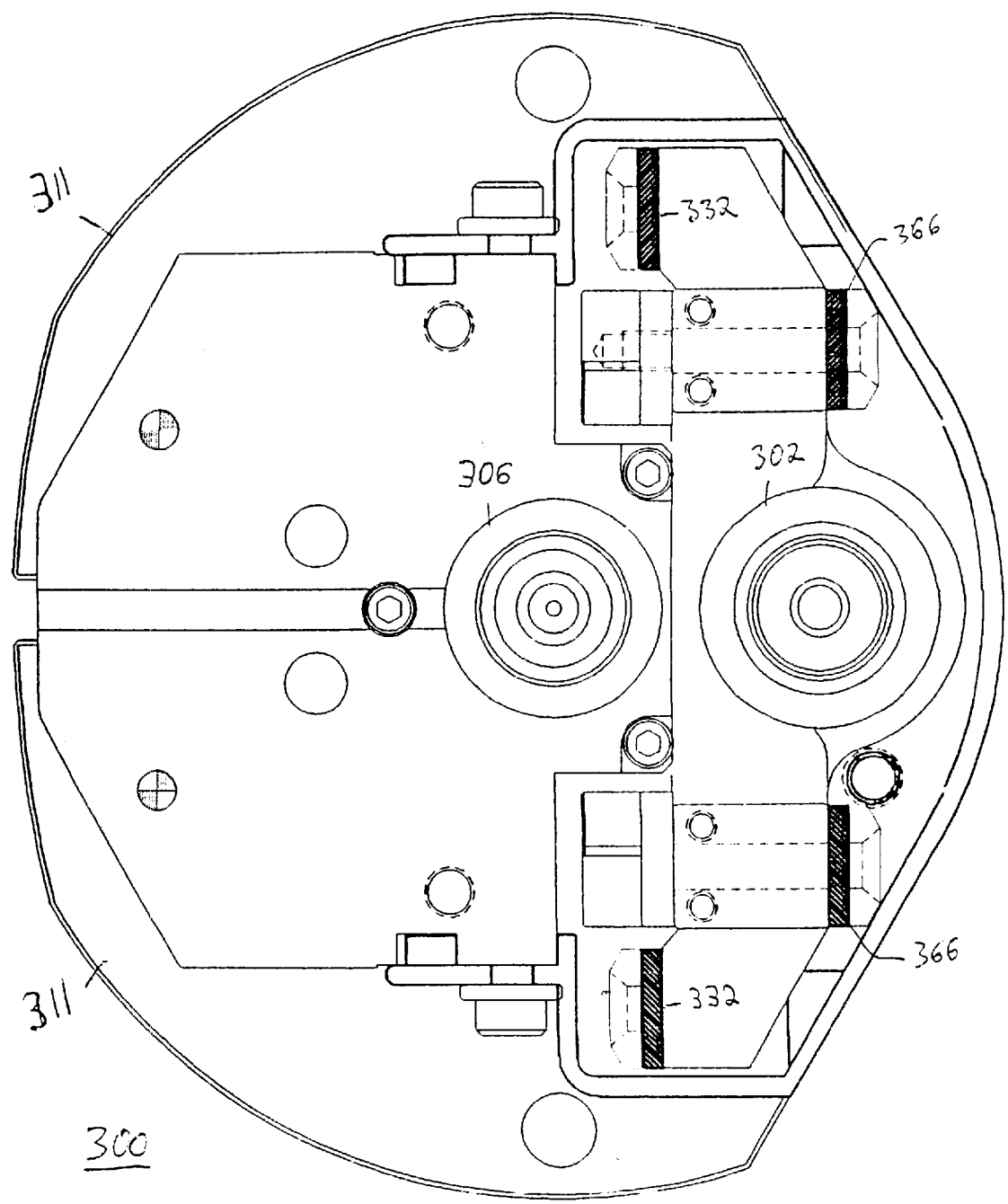
FIG. 12 is a top cut-away view of a third embodiment of the invention with the scrap stripper actuating assembly removed.

FIG. 12 is a plan view of the top of a third embodiment of the invention with the stripper actuating assembly removed. In this embodiment of the invention, the cutter assembly 300 comprises two flexible hinges; a first flexible hinge 332 and a second flexible hinge 366. This results in the moving knife 302 having a significant translational motion rather than a pivoting motion. The translational motion occurs because the offset between the two flexible hinges 332, 366 does not allow a pure pivoting motion. Thus, the moving knife support block 330 must move with a translational component. This provides improved knife motion when thicker, tougher materials are cut. In the preferred aspect of this embodiment, both of the flexible hinges 332, 366 comprise two pieces. However, either flexible hinge 332, 366 or both flexible hinges 332, 366 may be a single piece. Further, in order to avoid interference with other parts, the single piece may be in the shape of an "X", an "H" or include cutouts in various configurations.

Figure 13:
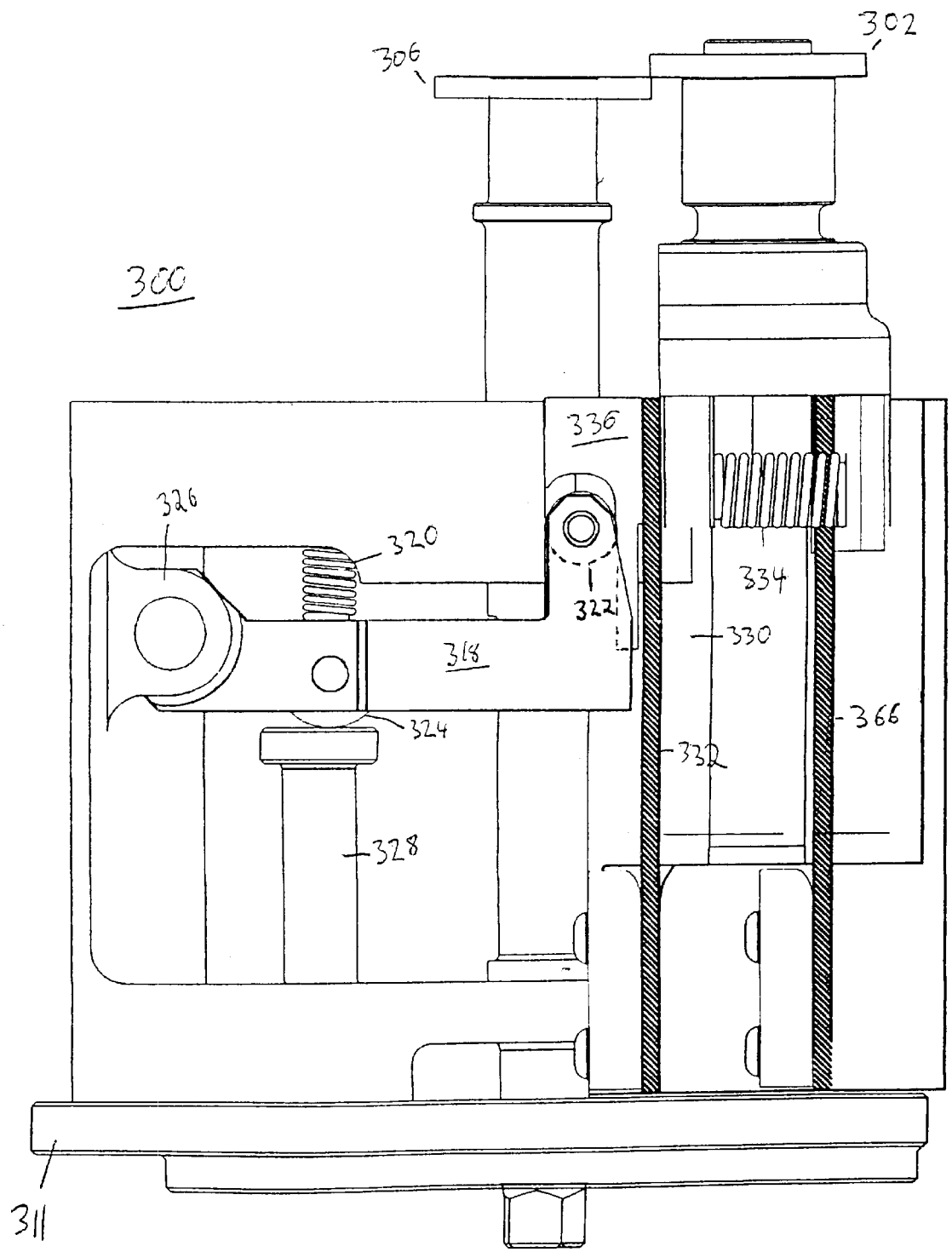
FIG. 13 is a side cut-away view of the third embodiment of the invention in the cutting position.

FIG. 13 is a side cut-away View of the third embodiment of the invention in the cutting position. Like the first embodiment, the moving knife 302 is held in the cutting position by a moving knife spring 334 which presses against the moving knife support block 330. Attached to the upper end of the flexible hinge 332, opposite the moving knife support block 330, is a striker plate 336. Abutting the striker plate 336 is a first rocker wheel 322 of a rocker arm 318. The rocker arm 318 is adapted to rotate about a rocker hinge 326. In the cutting position, a push rod 328 pushes against a second rocker wheel 324 affixed to maker arm 318. Exerting a force opposite the push rod 328 is a rocker spring 320. As in the first embodiment, in the cutting position, the moving knife 302 overlaps the fixed-longitudinal-axis knife 306. The overlap is preset in the factory and is preferably between 0.000 and 0.020 inches. More preferably, the overlap is between 0.005 and 0.015 inches.

Figure 14:
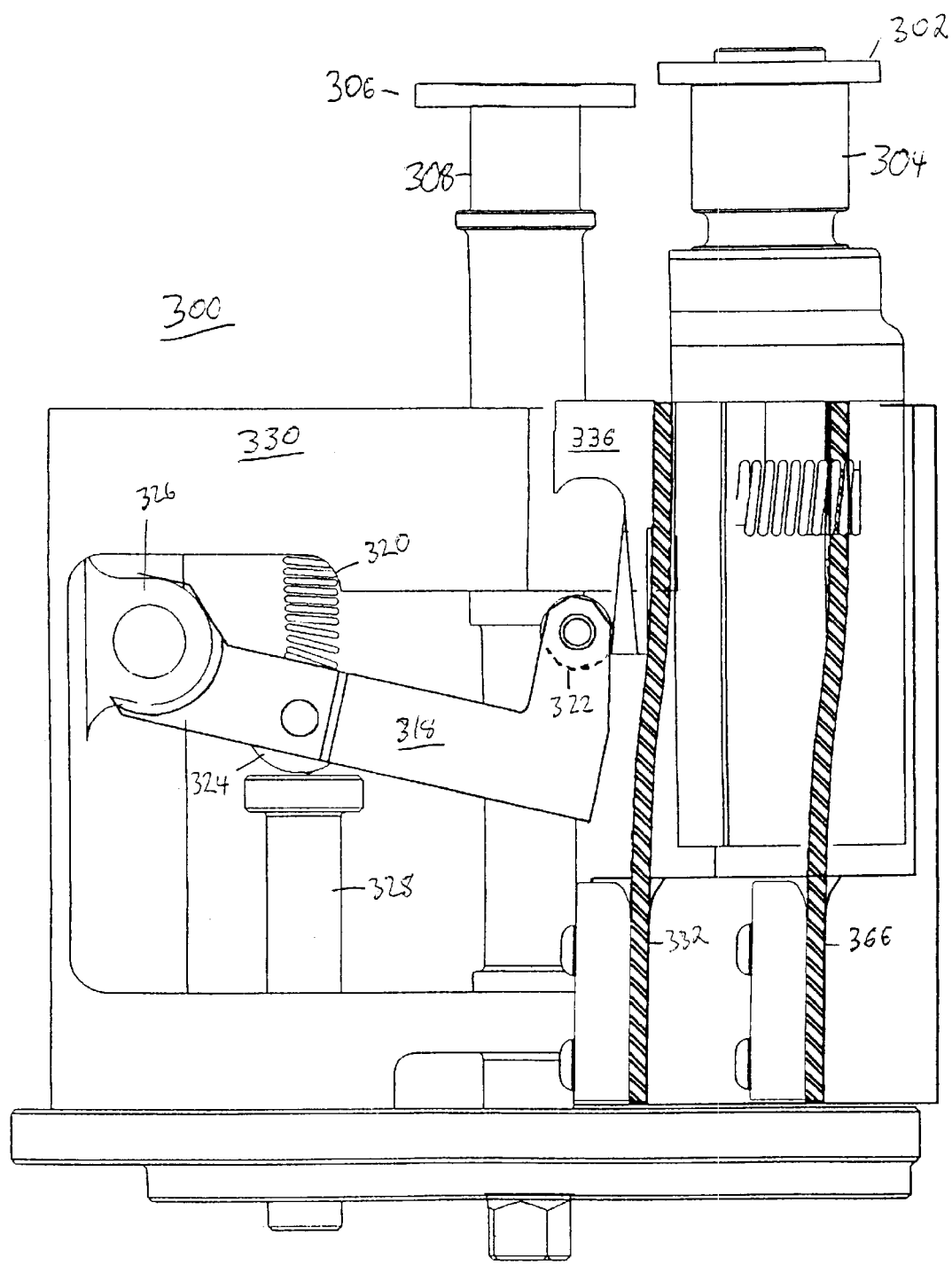
FIG. 14 is a side cut-away view of the third embodiment of the invention in the non-cutting position.

FIG. 14 illustrates a side cut-away of the third embodiment of the invention in a non-cutting position. When the push rod 328 is withdrawn, rocker spring 320 exerts a force causing the rocker arm 318 to pivot about the rocker hinge 326. As the rocker arm 318 rotates, the first rocker wheel 322 pushes against the striker plate 336, causing the flexible hinges 332, 366 to flex. The moving knife support block 330, the moving knife support shaft 304 and the moving knife 302 move away from the fixed-longitudinal-axis knife 306. The corresponding gap between the moving knife 302 and the fixed-longitudinal-axis knife 306 is preferably between 0.060 inches and 0.280 inches and more preferably between 0.120 inches and 0.160 inches.

Figure 15:
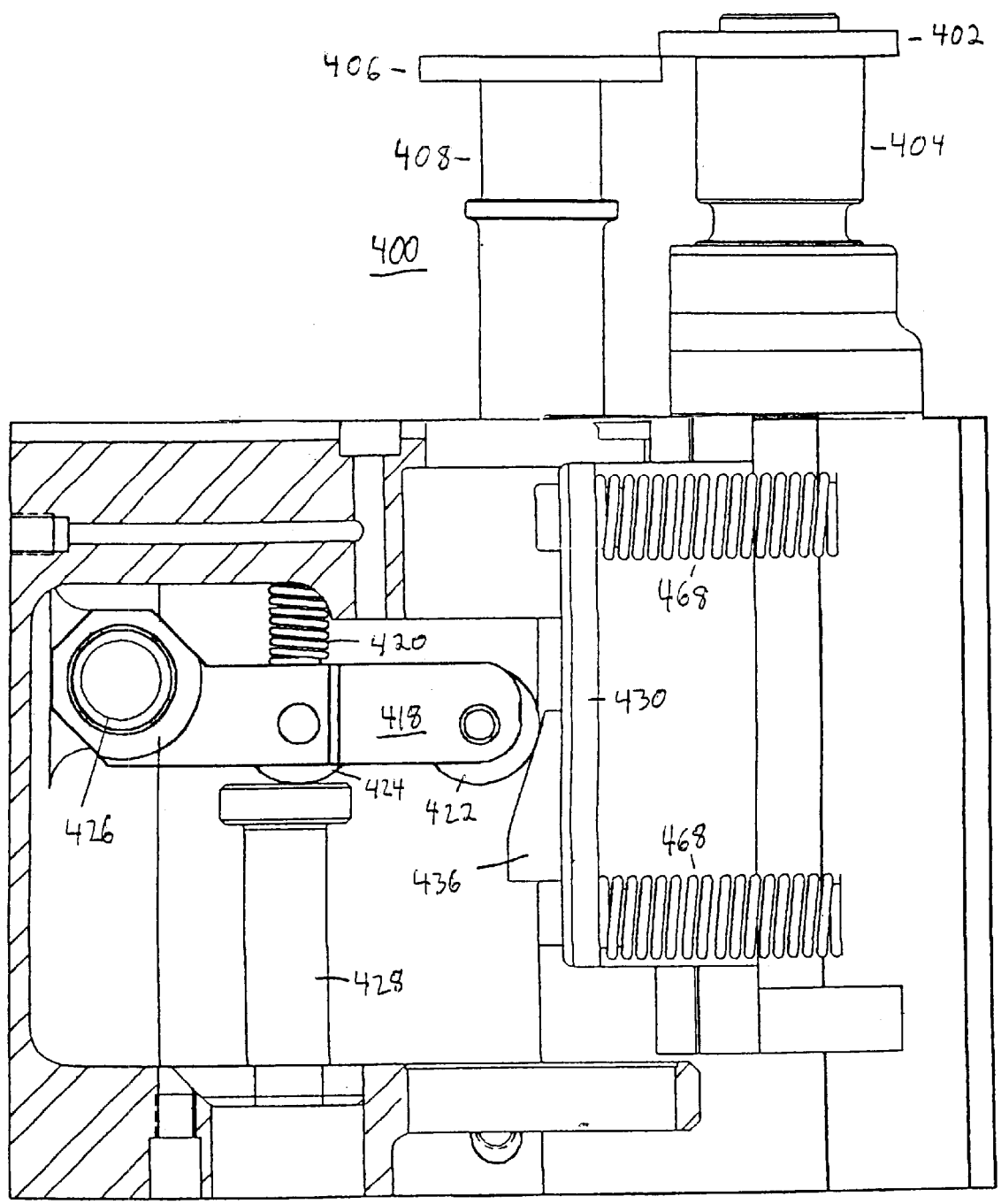
FIG. 15 is a side cut-away view of a fourth embodiment of the invention.
Figure 16:
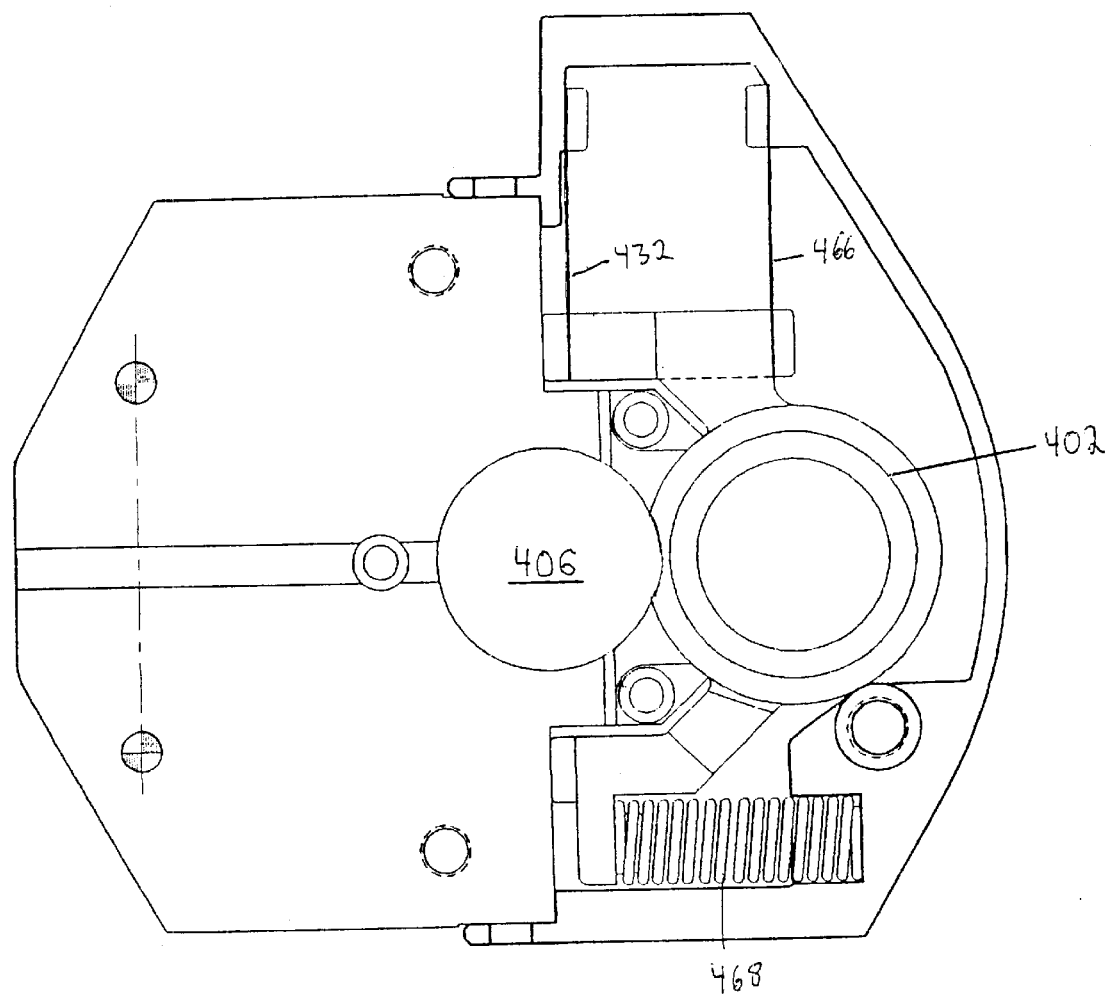
FIG. 16 is a plan view of the top of the fourth embodiment of the invention in the cutting position with the scrap stripper actuating assembly removed.
Figure 17:
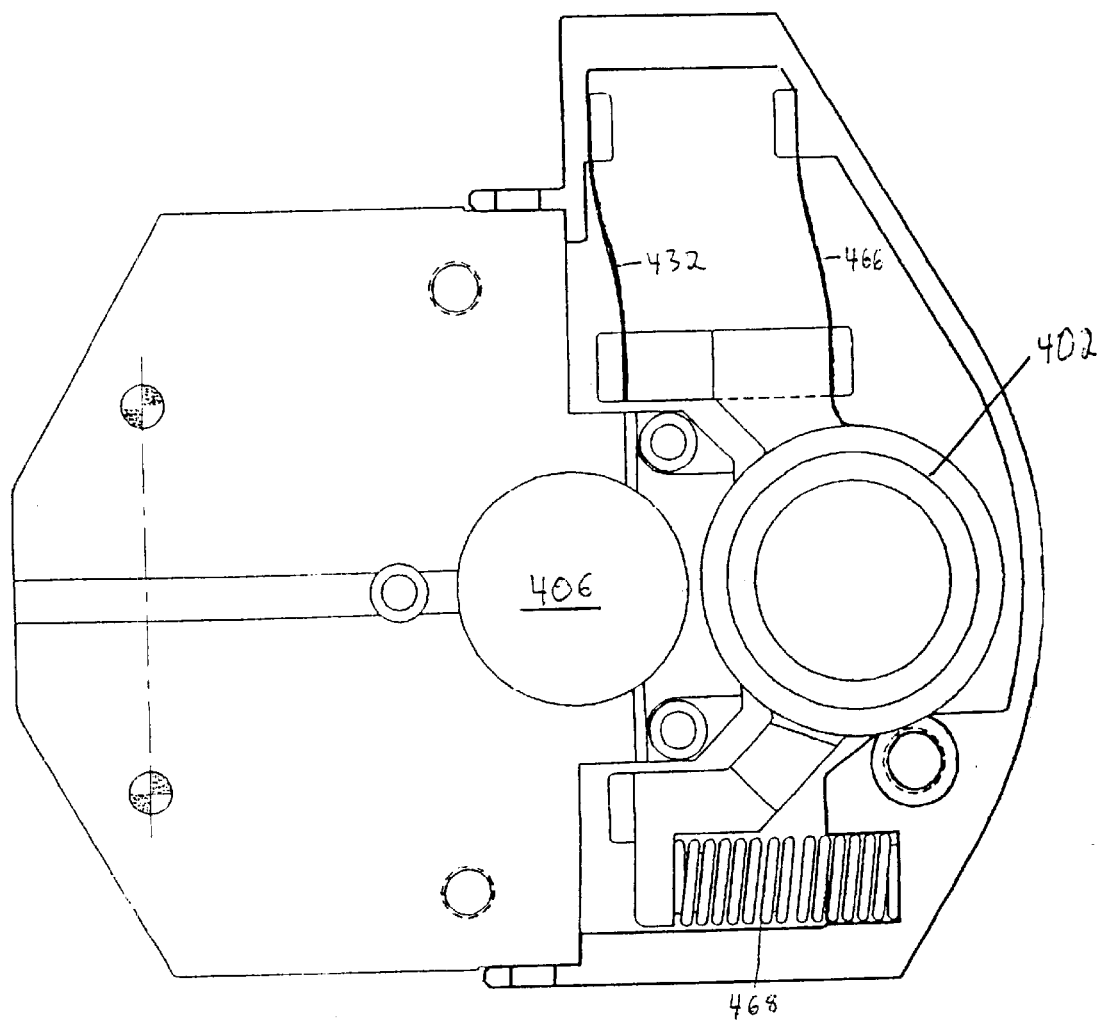
FIG. 17 is a plan view of the top of the fourth embodiment of the invention in the non-cutting position.

FIGS. 15–17 illustrate the fourth embodiment of the invention. FIG. 15 is a side cut-away view of the fourth embodiment while FIGS. 16 and 17 are top cut-away views of the cutting and non-cutting positions, respectively. The cutter assembly 400 has a moving knife 402 affixed to the top of a moving knife support shaft 404 and a fixed-longitudinal-axis knife 406 attached to a fixed-longitudinal-axis knife support shaft 408. This embodiment is similar to the third embodiment in that the cutter assembly 400 comprises two flexible hinges 432, 466. However, in this embodiment, each of the flexible hinges 432, 466 is fabricated from a single piece of material and is located on one side of the moving knife support block 430. On the opposite side of the moving knife support block 430 are a pair of springs 468. In this embodiment, the moving knife 402 is held in the cutting position by the two moving knife springs 468 which press against the moving knife support block 430. Attached to the upper end of the moving knife support block 430 is a striker plate 436. Abutting the striker plate 436 is a first rocker wheel 422 of a rocker arm 418. The rocker arm 418 is adapted to rotate about a rocker hinge 426. In the cutting position, a push rod 428 pushes against a second rocker wheel 424 affixed to rocker arm 418. Exerting a force opposite the push rod 428 is a rocker spring 420.

When the push rod 428 is withdrawn, rocker spring 420 exerts a force causing the rocker arm 418 to pivot about the rocker hinge 426, As the rocker arm 418 rotates, the first rocker wheel 422 pushes against the striker plate 436, causing the flexible hinges 432, 466 to flex and springs 468 to compress. The moving knife support block 430, the moving knife support shaft (not shown) and the moving knife (not shown) tilt away from the fixed-longitudinal-axis knife (not shown). The corresponding gap between the moving knife and the fixed-longitudinal-axis knife is preferably between 0.060 inches and 0.280 inches and more preferably between 0.120 inches and 0160 inches.

The foregoing description of the invention has been presented for purposes of illustration and description. It is not intended to be exhaustive or to limit the invention to the precise form disclosed, and modifications and variations are possible in light of the above teachings or may be acquired from practice of the invention. The drawings and description were chosen in order to explain the principles of the invention and its practical application. It is intended that the scope of the invention be defined by the claims appended hereto, and their equivalents.

What is claimed is:

1. A cutter assembly comprising:
   a fixed-longitudinal-axis knife support shaft with a top end and a bottom end;
   a fixed-longitudinal-axis knife mounted adjacent the top of the fixed-longitudinal-axis knife support shaft;
   a moving knife support shaft, having a top end, a bottom end and a longitudinal axis, the moving knife support shaft disposed to pivot substantially perpendicular to the longitudinal axis; and
   a moving knife mounted adjacent the top of the moving knife support shaft,
   wherein the moving knife has a non-cutting position and a cutting position and the longitudinal axis of the moving knife support shaft in the non-cutting position is inclined relative to the longitudinal axis of the moving knife support in the cutting position.

2. The cutter assembly of claim 1, further comprising at least one flexible hinge adapted to cause the moving knife support shaft to incline.

3. The cutter assembly of claim 2, wherein the flexible hinge is not flexed when the moving knife is in the cutting position.

4. The cutter assembly of claim 3, further comprising at least one spring to return the moving knife into the cutting position.

5. The cutter assembly of claim 2, wherein the flexible hinge is not flexed when the moving knife is in the non-cutting position.

6. The cutter assembly of claim 5, wherein the flexible hinge supplies sufficient spring force to return the moving knife into the non-cutting position.

7. The cutter assembly of claims 3 or 5, further comprising a rocker arm adapted to move the moving knife between the cutting and non-cutting positions.

8. The cutter assembly of claim 7, further comprising a rocker spring to assist in moving the rocker arm between the cutting and non-cutting positions.

9. The cutter assembly of claim 8, further comprising a striker plate attached to the flexible hinge.

10. The cutter assembly of claim 2, wherein the flexible hinge comprises a resilient material.

11. The cutter assembly of claim 10, wherein the flexible hinge comprises fiberglass.

12. The cutter assembly of claim 1, further comprising at least two flexible hinges adapted to cause the moving knife support shaft to incline.

13. The cutter assembly of claim 1, wherein the cutting tolerance is about 0.0004 inches.

14. The cutter assembly of claim 1, wherein the moving knife is canted at an angle to a longitudinal axis of a container to be cut.

15. The cutter assembly of claim 1, wherein the fixed-longitudinal-axis knife rotates about the axis of the fixed-longitudinal-axis knife support.

16. The cutter assembly of claim 1, wherein the moving knife rotates about the axis of the moving knife support.

17. The cutter assembly of claim 1, further comprising a scrap stripper actuating assembly.

18. The cutter assembly of claim 1, further comprising a stop.

19. The cutter assembly of claim 18, wherein the stop sets the depth of cut.

20. The cutter assembly of claim 1, further comprising springs on one side of the moving knife and at least one flexible hinge on another side the moving knife.

21. An apparatus for trimming containers comprising:
a rotating turret for supplying containers; and
the cutter assembly of claim 1.

22. The cutter assembly of claim 1, wherein the moving knife support shaft is adapted to be inclined about an axis perpendicular to a longitudinal axis of the fixed-longitudinal-axis knife support shaft.

23. A cutter assembly, comprising:
a fixed-longitudinal-axis knife support shaft with a top end and a bottom end;
a fixed-longitudinal-axis knife mounted adjacent the top of the fixed-longitudinal-axis knife support shaft;
a moving knife support shaft, having top end, a bottom end and a longitudinal axis, the moving knife support shaft disposed to pivot substantially perpendicular to the longitudinal axis; and
a moving knife mounted adjacent the top of the moving knife support shaft, wherein the moving knife has a non-cutting position and cutting position and the moving knife support is adapted to be inclined to put the moving knife into the cutting position;
at least one flexible hinge adapted to cause the moving knife support shaft to incline, wherein the flexible hinge is not flexed when the moving knife is in the cutting position;
a rocker arm adapted to move the moving knife between the cutting and non-cutting positions;
a rocker spring to assist in moving the rocker arm between the cutting and non-cutting positions;
a striker plate attached to the flexible hinge; and
a rocker wheel affixed to the rocker arm and adapted to roll along the striker plate.

24. The cutter assembly of claim 23, further comprising a push rod positioned on an opposite side of the rocker arm from the rocker spring and adapted to pivot the rocker arm.

25. A cutter assembly, comprising:
a fixed-longitudinal-axis knife support shaft with a top end and a bottom end;
a fixed-longitudinal-axis knife mounted adjacent the top of the fixed-longitudinal-axis knife support shaft;
a moving knife support shaft, having a top end, a bottom end and a longitudinal axis, the moving knife support shaft disposed to pivot substantially perpendicular to the longitudinal axis; and
a moving knife mounted adjacent the top of the moving knife support shaft,
wherein the moving knife has a non-cutting position and a cutting position and the moving knife support is adapted to be inclined to put the moving knife into the cutting position;
wherein adjustment of the knife clearance is made by turning a screw.

26. A cutter assembly comprising:
a fixed-longitudinal-axis knife support shaft with a top end and a bottom end;
a fixed-longitudinal-axis knife mounted adjacent the top end of the fixed-longitudinal-axis knife support shaft;
a moving knife support block;
a moving knife support shaft with a top end and a bottom end, the moving knife support shaft carried in the moving knife support block and tiltably mounted in a second housing piece;
a moving knife mounted adjacent the top end of the moving knife support shaft; and
at least one flexible hinge affixed to the moving knife support block,
wherein the moving knife has a non-cutting position and a cutting position and is adapted so that in the non-cutting position the moving knife support shaft is tilted away from the fixed-longitudinal-axis knife support shaft by flexing the flexible hinge such that the separation between the top of the fixed-longitudinal-axis knife support shaft and the top of the moving knife support increases while the separation between the bottom of the fixed-longitudinal-axis knife support shaft and the bottom of the moving knife support shaft remains essentially constant.

27. The cutter assembly of claim 26, wherein the flexible hinge comprises a resilient material.

28. The cutter assembly of claim 27, wherein the flexible hinge comprises fiberglass.

29. The cutter assembly of claim 28, further comprising at least one spring to return the moving knife into the cutting position.

30. The cutter assembly of claims 26, further comprising a rocker arm adapted move the moving knife between the cutting and non-cutting positions.

31. The cutter assembly of claim 30, further comprising a rocker spring to assist in moving the rocker arm between the cutting and non-cutting positions.

32. The cutter assembly of claim 31, further comprising a striker plate attached to the flexible hinge.

33. The cutter assembly of claim 26, further comprising at least two flexible hinges.

34. The cutter assembly of claim 26, wherein the cutting tolerance is about 0.0004 inches.

35. The cutter assembly of claim 26, wherein the moving knife is canted at an angle to the longitudinal axis of a container to be cut.

36. The cutter assembly of claim 26, wherein the fixed knife rotates about the axis of the fixed knife support.

37. The cutter assembly of claim 26, wherein the moving knife rotates about the axis of the moving knife support.

38. The cutter assembly of claim 26, further comprising a scrap stripper actuating assembly.

39. The cutter assembly of claim 26, further comprising a stop.

40. The cutter assembly of claim 39, wherein the stop sets the depth of cut.

41. The cutter assembly of claim 26, further comprising springs on one side of the moving knife and at least one flexible hinge on another side of the moving knife.

42. An apparatus for trimming containers comprising:
a rotating turret for supplying containers; and the cutter assembly of claim 26.

43. A cutter assembly, comprising:
a fixed-longitudinal-axis knife support shaft with a top end and a bottom end;
a fixed-longitudinal-axis knife mounted adjacent the top end of the fixed-longitudinal-axis knife support shaft;
a moving knife support block;
a moving knife support shaft with a top end and a bottom end, the moving knife support shaft carried in the moving knife support block and tiltably mounted in a second housing piece;
a moving knife mounted adjacent the top end of the moving knife support shaft;
at least one flexible hinge affixed to the moving knife support block, wherein the moving knife has a non-cutting position and a cutting position and is adapted so that in the non-cutting position the moving knife support shaft is tilted away from the fixed knife support shaft by flexing the flexible hinge such that the separation between the top of the fixed knife support shaft and the top of the moving knife support increases while the separation between the bottom of the fixed knife support shaft and the bottom of the moving knife support shaft remains essentially constant;
a rocker arm adapted to move the moving knife between the cutting and non-cutting positions;
a rocker spring to assist in moving the rocker arm between the cutting and non-cutting positions;
a striker plate attached to the flexible hinge; and
a rocker wheel affixed to the rocker arm and adapted to roll along the striker plate.

44. The cutter assembly of claim 43, further comprising a push rod positioned on an opposite side of the rocker arm from the rocker spring and adapted to pivot the rocker arm.

45. A cutter assembly, comprising:
a fixed-longitudinal-axis knife support shaft with a top end and a bottom end;
a fixed-longitudinal-axis knife mounted adjacent the top end of the fixed-longitudinal-axis knife support shaft;
a moving knife support block;
a moving knife support shaft with a top end and a bottom end, the moving knife support shaft carried in the moving knife support block and tiltably mounted in a second housing piece;
a moving knife mounted adjacent the top end of the moving knife support shaft;
at least one flexible hinge affixed to the moving knife support block, wherein the moving knife has a non-cutting position and a cutting position and is adapted so that in the non-cutting position the moving knife support shaft is tilted away from the fixed knife support shaft by flexing the flexible hinge such that the separation between the top of the fixed knife support shaft and the top of the moving knife support increases while the separation between the bottom of the fixed knife support shaft and the bottom of the moving knife support shaft remains essentially constant; and
an adjustment screw adapted to adjust the knife clearance.

46. A cutter assembly comprising:
a fixed-longitudinal-axis knife support shaft with a top end and a bottom end;
a fixed-longitudinal-axis knife mounted adjacent the top end of the fixed-longitudinal-axis knife support shaft;
a moving knife support block;
a moving knife support shaft with a top end and a bottom end, the moving knife support shaft carried in the moving knife support block and tiltably mounted in a second housing base;
a moving knife mounted adjacent the top end of the moving knife support shaft; and
at least one flexible hinge affixed to the moving knife support block,
wherein the moving knife has a non-cutting position and a cutting position and is adapted so that in the cutting position the moving knife support shaft is tilted toward the fixed-longitudinal-axis knife support shaft by flexing the flexible hinge such that the separation between the top of the fixed-longitudinal-axis knife support shaft and the top of the moving knife support decreases while the separation between the bottom of the fixed-longitudinal-axis knife support shaft and the bottom of the moving knife support shaft remains essentially constant.

47. The cutter assembly of claim 46, wherein the flexible hinge comprises a resilient material.

48. The cutter assembly of claim 47, wherein the flexible hinge comprises fiberglass.

49. The cutter assembly of claim 46, wherein the flexible hinge supplies sufficient spring force to return the moving knife into the non-cutting position.

50. The cutter assembly of claim 46, wherein the cutting tolerance is about 0.0004 inches.

51. The cutter assembly of claim 46, wherein the moving knife is canted at an angle to the longitudinal axis of a container to be cut.

52. The cutter assembly of claim 46, wherein the fixed-longitudinal-axis knife rotates about the axis of the fixed-longitudinal-axis knife support.

53. The cutter assembly of claim 43, wherein the moving knife rotates about the axis of the moving knife support.

54. The cutter assembly of claim 46, further comprising a scrap stripper actuating assembly.

55. The cutter assembly of claim 46, further comprising a stop.

56. The cutter assembly of claim 55, wherein the stop sets the depth of cut.

57. A cutter assembly, comprising:
a fixed-longitudinal-axis knife support shaft with a top end and a bottom end;
a fixed-longitudinal-axis knife mounted adjacent the top end of the fixed-longitudinal-axis knife support shaft;
a moving knife support block;
a moving knife support shaft with a top end and a bottom end, the moving knife support shaft carried in the moving knife support block and tiltably mounted in a second housing base;
a moving knife mounted adjacent the top end of the moving knife support shaft;
at least one flexible hinge affixed to the moving knife support block, wherein the moving knife has a non-cutting position and a cutting position and is adapted so that in the cutting position the moving knife support shaft is tilted toward the fixed-longitudinal-axis knife support shaft by flexing the flexible hinge such that the separation between the top of the fixed-longitudinal-axis knife support shaft and the top of the moving knife support decreases while the separation between the bottom of the fixed-longitudinal-axis knife support shaft and the bottom of the moving knife support shaft remains essentially constant; and
an adjustment screw adapted to adjust the knife clearance.

58. A cutter assembly for trimming a container with an inside and an outside comprising:

a fixed-longitudinal-axis cutting means mounted on a fixed-longitudinal-axis support means;

a moving cutting means mounted on a moving support means;

a means for advancing the container a predetermined distance onto a fixed-longitudinal-axis knife mounted on a fixed-longitudinal-axis knife support so that the fixed-longitudinal-axis knife is inside the container and a moving knife mounted on a moving knife support is outside of the container, the moving knife being opposed to the fixed-longitudinal-axis knife; and a means for inclining the moving cutting means from a non-cutting position to a cutting position by tilting the moving support means toward the fixed-longitudinal-axis support means such that the separation between a first end of the fixed-longitudinal-axis support means and a first end of the moving support means decreases in the cutting position while the separation between a second end of the fixed-longitudinal-axis support means and a second end of the moving support means remains constant.

59. A cutter assembly for trimming a container with an inside and an outside comprising:

a fixed-longitudinal-axis cutting means mounted on a fixed-longitudinal-axis support means;

a moving cutting means mounted on a moving support means;

a means for advancing the container a predetermined distance onto a fixed-longitudinal-axis knife mounted on a fixed-longitudinal-axis knife support so that the fixed-longitudinal-axis knife is inside the container and a moving knife mounted on a moving knife support is outside of the container, the moving knife being opposed to the fixed-longitudinal-axis knife; and a means for inclining the moving cutting means about an axis perpendicular to the axis of the moving support means to put the moving cutting means into the cutting position from a non-cutting position, wherein a longitudinal axis of the moving support means in the non-cutting position is inclined relative to the longitudinal axis of the moving support means in the cutting position.

60. A cutter assembly comprising:

a fixed-longitudinal-axis knife support shaft with a top end and a bottom end;

a fixed-longitudinal-axis knife mounted adjacent the top of the fixed-longitudinal-axis knife support shaft;

a moving knife support shaft, having a top end, a bottom end and a longitudinal axis, the moving knife support shaft disposed to pivot substantially perpendicular to the longitudinal axis;

a moving knife mounted adjacent the top of the moving knife support shaft, wherein the moving knife has a non-cutting position and a cutting position and the moving knife support is adapted to be inclined to put the moving knife into the cutting position; and wherein the moving knife support shaft is adapted to be inclined without the use of a pivot pin.

61. A cutter assembly, comprising:

a fixed-longitudinal-axis knife support shaft with a top end and a bottom end;

a fixed-longitudinal-axis knife mounted adjacent the top of the fixed-longitudinal-axis knife support shaft;

a moving knife support shaft, having a top end, a bottom end and a longitudinal axis, the moving knife support shaft disposed to pivot substantiality perpendicular to the longitudinal axis; and a moving knife mounted adjacent the top of the moving knife support shaft, wherein the moving knife has a non-cutting position and a cutting position and the moving knife support is adapted to be inclined to put the moving knife into the cutting position;

at least one flexible hinge adapted to cause the moving knife support shaft to incline, wherein the flexible hinge is not flexed when the moving knife is in the non-cutting position;

a rocker arm adapted to move the moving knife between the cutting and non-cutting positions;

a rocker spring to assist in moving the rocker arm between the cutting and non-cutting positions;

a striker plate attached to the flexible hinge; and a rocker wheel affixed to the rocker arm and adapted to roll along the striker plate.

\* \* \* \* \*